(12) United States Patent
Buer et al.

(10) Patent No.: US 10,804,616 B2
(45) Date of Patent: Oct. 13, 2020

(54) CIRCUIT ARCHITECTURE FOR DISTRIBUTED MULTIPLEXED CONTROL AND ELEMENT SIGNALS FOR PHASED ARRAY ANTENNA

(71) Applicant: ViaSat Inc., Carlsbad, CA (US)

(72) Inventors: Kenneth V. Buer, Gilbert, AZ (US);
Ronald S. Lipton, Chandler, AZ (US);
Ashitkumar J. Tripathi, Chandler, AZ (US)

(73) Assignee: Viasat, Inc., Carlsbad, CA (US)

( * ) Notice: Subject to any disclaimer, the term of this patent is extended or adjusted under 35 U.S.C. 154(b) by 204 days.

(21) Appl. No.: 16/123,582

(22) Filed: Sep. 6, 2018

(65) Prior Publication Data

US 2019/0305418 A1      Oct. 3, 2019

Related U.S. Application Data

(60) Provisional application No. 62/648,527, filed on Mar. 27, 2018.

(51) Int. Cl.
*H01Q 21/00* (2006.01)
*H04B 7/06* (2006.01)

(52) U.S. Cl.
CPC ....... *H01Q 21/0006* (2013.01); *H04B 7/0617* (2013.01)

(58) Field of Classification Search
CPC .... H01Q 21/0006; H01Q 3/26; H01Q 3/2676; H01Q 3/29; H04B 7/0617
See application file for complete search history.

(56) References Cited

U.S. PATENT DOCUMENTS

| 4,090,199 A | 5/1978 | Archer |
| 5,027,126 A | 6/1991 | Basehgi et al. |

(Continued)

FOREIGN PATENT DOCUMENTS

| JP | H11 163629 A | 6/1999 |
| KR | 101056783 | 8/2011 |
| WO | WO2014/191425 A1 | 12/2014 |

OTHER PUBLICATIONS

Heim et al., entitled "Frequency Division Multiplexed Microwave and Baseband Digital Optical Fiber Link for Phased Array Antennas", IEEE vol. 38, No. 5 published May 1990, 7 pgs.

(Continued)

*Primary Examiner* — Bernarr E Gregory
*Assistant Examiner* — Fred H Mull
(74) *Attorney, Agent, or Firm* — Holland & Hart LLP

(57) ABSTRACT

The phased array antenna system is described. The phased array antenna system formed on one or more layers of a printed circuit board (PCB). The phased array antenna system be may include a beam forming network to convert between one or more element signals and a beam signal. The phased array antenna system may include one or more control circuits, where each control circuit may receive the element signals for corresponding antenna element. Each of the control circuits may further may establish a control signal path and an element signal path between the antenna elements and the beamforming network, where the signal path may carry multiplexed element and control signals. The control circuits may include a signal adjustment circuit that may adjust the corresponding element signal (e.g., in phase or amplitude) based on the control signal.

28 Claims, 8 Drawing Sheets

(56) References Cited

U.S. PATENT DOCUMENTS

| | | | |
|---|---|---|---|
| 5,247,309 A * | 9/1993 | Reich | H01Q 3/2676 |
| | | | 342/175 |
| 5,818,386 A | 10/1998 | Belisle | |
| 5,864,322 A | 1/1999 | Pollon et al. | |
| 6,208,287 B1 | 3/2001 | Sikina et al. | |
| 6,426,721 B1 | 7/2002 | Obara | |
| 6,895,217 B1 | 5/2005 | Chang et al. | |
| 7,109,919 B2 | 9/2006 | Howell | |
| 7,460,615 B2 | 12/2008 | Kunysz et al. | |
| 8,013,791 B1 | 9/2011 | Weber et al. | |
| 8,154,469 B2 | 4/2012 | McKinley et al. | |
| 8,400,355 B1 | 3/2013 | Gaeta | |
| 2002/0132644 A1 * | 9/2002 | Mellor | H01Q 21/29 |
| | | | 455/562.1 |
| 2006/0264184 A1 | 11/2006 | Li et al. | |
| 2012/0154227 A1 * | 6/2012 | Adlerstein | H01Q 21/0006 |
| | | | 343/703 |
| 2016/0302208 A1 | 10/2016 | Sturkovich et al. | |
| 2016/0315385 A1 | 10/2016 | Grass et al. | |
| 2017/0077613 A1 | 3/2017 | Banu et al. | |
| 2017/0170559 A1 | 6/2017 | Van de Water | |
| 2019/0326958 A1 * | 10/2019 | Leipold | H01Q 3/26 |

OTHER PUBLICATIONS

Shalkhauser et al., entitled "System-Level Integrated Circuit Development for Phased-Array Antenna Applications", SPIE Proceedings, vol. 1475 dated Jul. 1, 1991, 6 pgs.

PCT International Search Report and Written Opinion, International Application No. PCT/US2018/066900, dated Dec. 20, 2018, 12 pgs.

* cited by examiner

CIRCUIT ARCHITECTURE FOR DISTRIBUTED MULTIPLEXED CONTROL AND ELEMENT SIGNALS FOR PHASED ARRAY ANTENNA

CROSS REFERENCES

This application claims priority to U.S. Provisional Application No. 62/648,527, entitled "MULTIPLEXED CONTROL AND RF SIGNALS ON BEAM FORMING NETWORK," which was filed on Mar. 27, 2018, the contents of which are hereby incorporated by reference herein in their entirety.

BACKGROUND

Phased array antennas may be used in some wireless communications systems. A phased array antenna may be configured to steer one or more beams in different directions by way of manipulating phase and/or amplitude relationships of each individual antenna element of the phased array antenna. For example, the phased array antenna may be configured to point one or more beams at a target during operation. In some cases, the phased array antenna may be mounted on a moving system, for example, a vehicle. In some cases, however, it may be desirable to keep the overall cost of the antenna system relatively low. In these cases, a cost-efficient and relatively compact architecture for phased array antennas that maintains robust performance may be desirable.

SUMMARY

A phased array antenna system is described. The phased array antenna system may include a beam forming network to convert between one or more element signals at one or more element signal ports and a beam signal at a common signal port of the beam forming network. The beam forming network may be located on one or more layers of a printed circuit board (PCB).

The phased array antenna system may include a first signal routing circuit (e.g., a diplexer) to provide a control signal from a controller to the element signal port, where the beam forming network may distribute the control signal to each of the one or more element signal ports. The phased array antenna system may include one or more control circuits located on a first layer of the PCB, where each control circuit may include a first port coupled to a corresponding element signal port of the one or more element signal ports and a second port coupled to a corresponding antenna element. Respective antenna elements may correspond to respective control circuits located on a second layer of the PCB.

Each of the one or more control circuits may include a second signal routing circuit (e.g., a second diplexer) coupled to the first port. The second signal routing circuit may establish an element signal path for a corresponding element signal of the one or more element signals communicated between the first port and the second port. The second signal routing circuit may further establish a control signal path for the control signal received via the first port. Each of the one or more control circuits may further include a signal adjustment circuit along the element signal path and the control signal path. The signal adjustment circuit may adjust the corresponding element signal (e.g., in phase or amplitude) based on the control signal.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
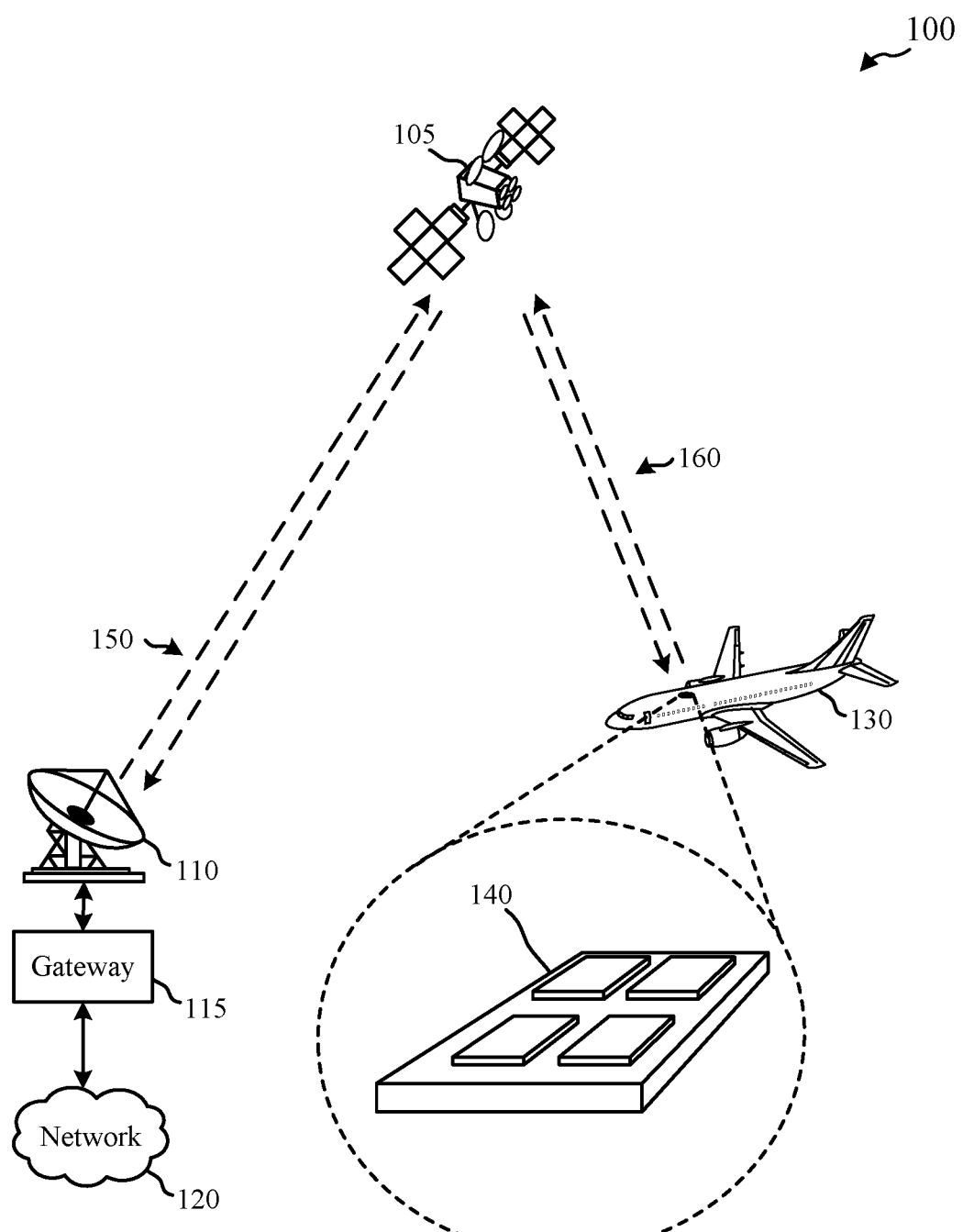
FIG. 1 shows a diagram of a satellite communication system in accordance with aspects of the present disclosure.

The described features generally relate to a circuit architecture for distributed multiplexed control and element signals for a phased array antenna. A phased array antenna may be configured to steer one or more beams in different directions by way of manipulating phase and/or amplitude relationships of each individual antenna element of the phased array antenna. For example, the phased array antenna may be configured to point one or more beams at a satellite (e.g., to actively track the satellite) during operation. For some such applications, a relatively low-cost architecture for phased array antennas that maintains robust performance may be desirable. For example, cost-efficient phased array antennas may facilitate economic incorporation in satellite residential user terminal applications, commercial and individual automotive applications, etc. Further, in some applications, such as for UAVs and smaller manned aircraft (e.g., regional and business jets), a relatively smaller and more compact phased array antenna architecture may facilitate a relatively smaller, lighter, and/or more cost-efficient product.

One way to reduce the size and manufacturing cost of such phased array antennas is to reduce the size and manufacturing cost of the design of a control circuit architecture for the phased array antennas. A phased array antenna control circuit may be manufactured across one or more layers of a printed circuit board (PCB). As complexity of the control circuit architecture and the number of printed layers of the PCB increases, the overall manufacturing cost of the phased array antenna will also generally increase. A distributed control circuit architecture may provide signal paths to multiple distributed control circuits and corresponding antenna elements, where one signal path may be used to carry a control signal for control circuits multiplexed with an element signal to or from the antenna element. This architecture may, for example, use relatively fewer PCB layers, and may reduce the overall complexity and manufacturing cost of such PCB-based phased array antenna systems.

Techniques described herein may provide for a distributed control circuit architecture using a shared signal path carrying both control and element signals for each of one or more control circuits distributed along the signal paths between a beam forming network and respective individual antenna elements of the phased array antenna. In some cases, the phased array antenna may be a transmitting phased array antenna, a receiving phased array antenna, or perform the operations of both. The beam forming network may convert between a beam signal at a common signal port and one or more element signals at respective element signal ports corresponding to particular antenna elements of the phased array antenna. For example, in the case of a transmitting phased array antenna, the beam forming network may convert a transmit beam signal into multiple transmit element signals to be transmitted by respective antenna elements of the antenna array. Additionally or alternatively, in the case of a receiving phased array antenna, the beam forming network may convert multiple receive element signals received by respective antenna elements of the antenna array into a receive beam signal.

The beam forming network may further distribute a control signal multiplexed with the beam signal at the common signal port to the respective element signal ports corresponding to particular antenna elements of the phased array antenna. The control signal may be routed by the beam forming network to control circuits at the respective element signal ports via respective signal paths. The control circuits may each have a first port connected via a signal path to a respective element signal port of the beam forming network and a second port connected via a signal path to a respective antenna element of the antenna array. In some cases, the control signal may be multiplexed with an element signal, for example, on the signal received at the first port of the control circuit from the element port of the beam forming network. The control circuits may each be configured to extract the control signal multiplexed with the element signal and to apply an adjustment to the element signal. In particular, the control circuits may include routing circuitry to establish a signal path for a corresponding element signal and a signal path for a corresponding control signal each received via the first port of the control circuit. The control circuit may further include a signal adjustment circuit along one or both paths to adjust the element signals based on the respective control signals. Accordingly, a single signal path passing through one respective control circuit from the beam forming network may be used for both the control signals and the element signals for each antenna element. Thus, PCB complexity, including a number PCB layers, may be reduced, lowering the manufacturing cost of the phased array antenna.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communication system 100 in accordance with aspects of the present disclosure. The satellite communication system 100 includes a satellite 105, a gateway 115, a gateway antenna system 110, and an aircraft 130. The gateway 115 communicates with one or more networks 120. In operation, the satellite communication system 100 provides for two-way communications between the aircraft 130 and the network 120 through the satellite 105 and the gateway 115.

The satellite 105 may be any suitable type of communication satellite. In some examples, the satellite 105 may be in a geosynchronous or geostationary earth orbit (GEO). In other examples, any appropriate orbit (e.g., low earth orbit (LEO), medium earth orbit (MEO), etc.) for satellite 105 may be used. The satellite 105 may be a multi-beam satellite configured to provide service for multiple service beam coverage areas in a predefined geographical service area. In some examples, the satellite communication system 100 includes multiple satellites 105.

The gateway antenna system 110 may be two-way capable and designed with adequate transmit power and receive sensitivity to communicate reliably with the satellite communication system 100. The satellite communication system 100 may communicate with the gateway antenna system 110 by sending and receiving signals through one or more beams 150. The gateway 115 sends and receives signals to and from the satellite communication system 100 using the gateway antenna system 110. The gateway 115 is connected to the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The aircraft 130 includes an on-board communication system including an antenna array 140, for example, arrays of patch antennas. The on-board communication system of the aircraft 130 may provide communication services for communication devices of the aircraft 130 via a modem (not shown). Communication devices may connect to and access the networks 120 through the modem. For example, mobile devices may communicate with one or more networks 120 via network connections to modem, which may be wired or wireless. A wireless connection may be, for example, of a wireless local area network (WLAN) technology such as the Institute of Electrical and Electronics Engineers (IEEE) 802.11 (Wi-Fi), or other wireless communication technology.

The aircraft 130 may use the antenna array 140 to communicate with the satellite 105 over one or more beams 160. The antennas array 140 may be mounted on the outside of the fuselage of the aircraft 130. In some cases, the antenna array 140 be a phased array antenna. Phased array antennas may be configured to steer the one or more beams 160 in particular directions by way of manipulating phase and/or amplitude relationships of individual antennas of the phased array antenna. For example, the antenna array 140 may be configured to point the one or more beams 160 at the satellite (e.g., to actively track the satellite) during operation. The antenna array 140 may be used for receiving communication signals from the satellite 105, transmitting communication signals to the satellite 105, or bi-directional communication with the satellite 105 (i.e., transmitting and receiving communication signals). The antenna array 140 may operate in the International Telecommunications Union (ITU) Ku, K, or Ka-bands, for example from approximately 17 to 31 Giga-Hertz (GHz). Alternatively, the antenna array 140 may operate in other frequency bands such as C-band, X-band, S-band, L-band, and the like. Although a single antenna array 140 is illustrated, more than one antenna array 140 may be used for communication, in some cases.

The antenna array 140 may be within a housing or enclosure, which may protect the antenna array 140 from environmental elements and may be constructed of a material or materials that do not substantially attenuate communication signals. Additionally, the antenna array 140 may be used in other applications besides onboard the aircraft 130, such as onboard boats, vehicles, or on ground-based stationary systems. For some such applications, a relatively low-cost architecture for phased array antennas that maintains robust performance may be desirable. For example, cost-efficient phased array antennas may facilitate economic incorporation in satellite residential user terminal applications, commercial and individual automotive applications, etc. Further, in some applications, such as for UAVs and smaller manned aircraft (e.g., regional and business jets), a relatively smaller and more compact phased array antenna architecture may facilitate a relatively smaller, lighter, and/or more cost-efficient product. For example, the housing for a phased array antenna may be substantially smaller than a radome used for a mechanically gimballed passive antenna array.

One way to reduce the size and manufacturing cost of such phased array antennas is to reduce the size and manufacturing cost of the design of a control circuit architecture for the phased array antennas. A phased array antenna control circuit may be manufactured across one or more layers of a PCB. As complexity of the control circuit architecture and the number of printed layers of the PCB increases, the overall manufacturing cost of the phased array antenna will also generally increase. A distributed multiplexed control and element signal architecture may multiplex control signals for multiple distributed control circuits and corresponding antenna elements with an element signal for transmission or reception via the antenna elements on the same signal paths. This architecture may, for example, use relatively fewer PCB layers, and may reduce the overall complexity and manufacturing cost of such PCB-based phased array antenna systems.

Techniques described herein provide for a distributed multiplexed control and element signal architecture using a shared signal path carrying both control and element signals for each of one or more control circuits distributed along the signal paths between a beam forming network and respective individual antenna elements of the phased array antenna. In the described distributed multiplexed control and element signal architecture, the signal paths may carry a control signal including control data for the control circuits multiplexed (e.g., via frequency-domain multiplexing (FDM), and the like) with element signals (i.e., radio frequency (RF) signals) for transmission or reception via the respective antenna elements. In doing so, a single signal path may be used for both the control and the element signals for each antenna element, rather than, for example, having separate dedicated control and element signal paths. For example, as further described below, a single signal path may carry control information multiplexed with element signals sent to or from corresponding antenna elements. For instance, the control signal may be multiplexed with a transmit element signal in the same direction from the beamforming network. Alternatively, the control signal may be multiplexed with receive element signals combined in the beamforming network. According to the described techniques, PCB complexity, including a number PCB layers, may be reduced, lowering the manufacturing cost of the phased array antenna.

Figure 2:
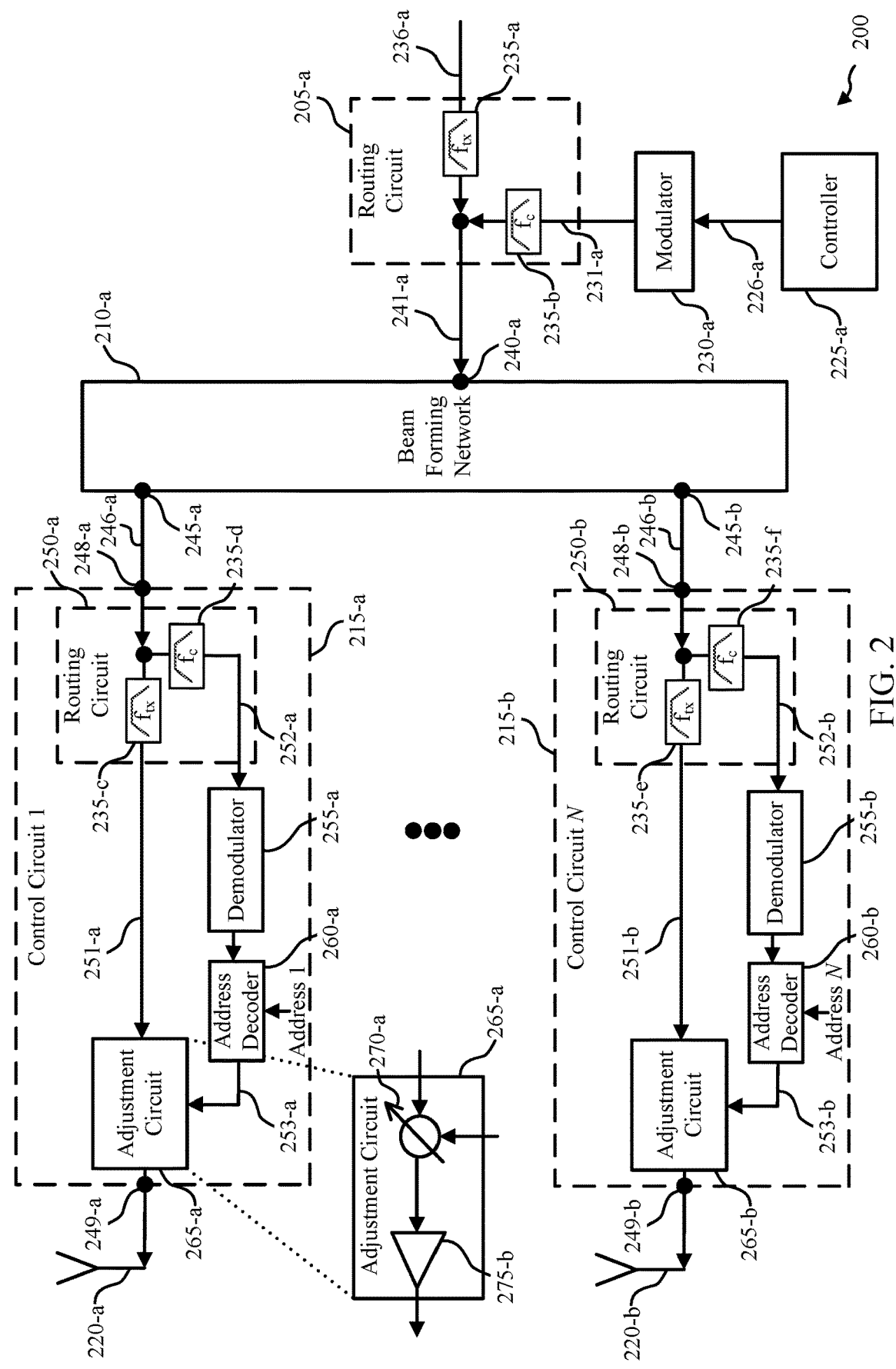
FIG. 2 illustrates an example diagram of a circuit architecture for distributed multiplexed control and element signals for a phased array antenna in accordance with aspects of the present disclosure.

FIG. 2 illustrates an example diagram 200 of a circuit architecture for distributed multiplexed control and element signals for a phased array antenna in accordance with aspects of the present disclosure. The phased array antenna may be an example of one or more of the antenna arrays 140, as described with reference to FIG. 1. The phased array antenna of FIG. 2 may be an example of a transmit phased array antenna for transmitting communication signals to the satellite 105, as described with reference to FIG. 1.

As shown in FIG. 2, the circuit architecture includes a first routing circuit 205-a, a beam forming network 210-a, multiple control circuits 215, and multiple antenna elements 220. In the example of FIG. 2, a first control circuit 215-a and a corresponding first antenna element 220-a and a second control circuit 215-b and a corresponding second antenna element 220-b are shown. It should be appreciated, however, that any number N of control circuits 215 for antenna elements 220 may be implemented similarly. Hence, the first control circuit 215-a may at times be referred to as "control circuit 1," and the second control circuit 215-b may at times be referred to as "control circuit N." Element signals communicated via the antenna elements 220 may be arranged to form an antenna beam with desired characteristics (e.g., individual element signals communicated via each antenna element 220 may be configured with a particular phase and/or amplitude relative to individual element signals communicated via other antenna elements 220 to steer the antenna beam in a desired direction). As illustrated in FIG. 2, there is a one-to-one correspondence between control circuits 215 and antenna elements 220 (i.e., there is a different control circuit 215 connected to each antenna element 220). However, it is to be appreciated that in some cases one control circuit 215 may be shared among multiple antenna elements 220 (i.e., one control circuit 215 may be connected to, and provide respective signaling to, multiple antenna elements 220).

As described above, the phased array antenna may be a PCB-based antenna system in which the phased array antenna and corresponding control architecture are printed or otherwise formed on one or more layers of a PCB. A PCB may include signal paths across one or more PCB layers (e.g., conductive lines, traces, vias connecting traces on different PCB layers, or planes). For example, a signal path may include a PCB transmission line made up of one or more conductive lines and a ground plane or ground lines. As described herein, a layer may refer to a single layer of conductive material (which may include conductive lines and/or one or more ground planes and/or one or more ground lines). For example, a "two-layer PCB" may include two layers of conductive material separated by a dielectric substrate, a "four-layer PCB" may include four layers of conductive material separated by three dielectric substrates, etc.). The number of layers of conductive signal lines and ground lines or planes that form a transmission line within a PCB may vary based on a type of the transmission line (e.g., microstrip, stripline, coplanar waveguide etc.). For example, a transmission line in a PCB may include one conductive line layer and one or more ground lines or planes within the same layer as the conductive line layer, or in different layers. The signal paths may carry signals, such as control signals, beam signals, element signals, and the like, between the connected components or ports, and signal paths may include one or more PCB transmission lines that are within the same or different layers.

When configured as a transmit phased array antenna, the phased array antenna may be configured to transmit a beam at a desired scan angle direction relative to boresight (e.g., in a direction to track a target satellite). The first routing circuit 205-a (e.g., a diplexer or other multiplexer, or other type of signal routing circuit) may receive a transmit beam signal 236-a from, for example, a transmission processor, to be transmitted as a transmit beam by the phased array antenna. The first routing circuit 205-a may further receive control data 226-a from a controller 225-a. The control data 226-a may indicate adjustment values (e.g., amplitude and/or phase) for one or more of the N control circuits 215 to be applied by respective control circuits (as discussed below) to transmit the transmit beam in a desired scan angle direction.

The phased array antenna may include a modulator 230-a (e.g., an amplitude shift keying (ASK), or phase shift keying (PSK) modulator) that modulates the control data 226-a to produce a control signal 231-a. The modulator 230-a may modulate the control data 226-a received from the controller 225-a and pass the modulated control signal 231-a to the first routing circuit 205-a. In some cases, the modulator 230-a may be implemented within or as a component of the controller 225-a. In some cases, the control signal 231-a and the transmit beam signal 236-a may occupy different, non-overlapping frequency ranges. The multiplexer of the first routing circuit 205-a may multiplex the transmit beam signal 236-a (having a center frequency $f_{tx}$) and the control signal 231-a (having a center frequency $f_c$) using, for example, FDM, to generate a composite multiplexed signal 241-a including the transmit beam signal 236-a and the control signal 231-a. Different possible implementations for the are first routing circuit 205-a may be used. For example, in FIG. 2, the first routing circuit 205-a is a diplexer (i.e., a multiplexer with two inputs) including two bandpass filters 235—one for each input. The first bandpass filter 235-a may allow signals of a first frequency range to pass, where the first frequency range corresponds to at least a frequency range of the transmit beam signal 236-a. The transmit beam signal 236-a may be, for example, a modulated transmit beam signal, with a modulating transmit signal beam signal modulated with a carrier frequency $f_{tx}$ for the transmit beam signal. Although shown having a center frequency equal to $f_{tx}$, the center frequency of the first bandpass filter may not be the same as the carrier frequency $f_{tx}$ for the transmit beam signal, as long as the first frequency range allows the transmit beam signal 236-a to pass (e.g., while excluding the control signal 231-a). The second bandpass filter 235-b may allow signals within a second frequency range to pass, where the second frequency range corresponds to at least a frequency range of the control signal 231-a. The control signal 231-a may be, for example, a modulated control signal, with control data 226-a modulated with a carrier frequency $f_c$ for the control signal, where the carrier frequency for the control signal is different from the carrier frequency for the transmit beam signal. Although shown having a center frequency equal to $f_c$, the center frequency of the second bandpass filter may not be the same as the carrier frequency $f_c$ for the control signal, as long as the second frequency range allows the control signal 231-a to pass (e.g., while excluding the transmit beam signal 236-a).

Alternatively, in other embodiments in which the carrier of the control signal 231-a is of a lower frequency than the carrier of the transmit beam signal 236-a, a high-pass signal path may be formed in place of the first bandpass filter 235-a, and a low-pass signal path may be used in place of the second bandpass filter 235-b. The high-pass signal path may be formed (e.g., using PCB traces) that allows signals within a higher frequency range to pass, where the higher frequency range is sufficient for the transmit beam signal 236-a (e.g., the modulated transmit beam signal). The low-pass signal path may be formed (e.g., using components such as capacitors and inductors) to allow signals within a lower frequency range to pass, where the lower frequency range is sufficient for the control signal 231-a (e.g., the modulated control signal).

The first routing circuit 205-a may provide the composite multiplexed signal 241-a, including the transmit beam signal 236-a multiplexed with the control signal 231-a, to a common signal port 240-a of the beam forming network 210-a. The beam forming network 210-a may include one or more stages of PCB dividers (e.g., equal-way and/or unequal way, in-phase and/or out-of-phase, or a combination) that divide the composite multiplexed signal 241-a to produce individual output signals 246 (e.g., output signal 246-a and output signal 246-b) at corresponding output element signal ports 245 (e.g., element signal port 245-a and element signal port 245-b) of the beam forming network 210-a. That is, the beam forming network 210-a may divide the composite multiplexed signal 241-a into individual output signals 246, each individual output signal 246 including an individual element signal and an individual control signal that are copies of the transmit beam signal 236-a and the control signal 231-a, respectively. The one or more stages of PCB dividers may provide relative amplitude and/or phase shifts between the individual element signals of the individual output signals 246 as part of the overall beamforming of the phased array antenna. In such a case, the individual control signals of the individual output signals 246 may also experience relative amplitude and/or phase shifts due to the one or more stages of PCB dividers. However, such relative shifts in amplitude and/or phase shifts are applied to the carriers of the individual control signals and thus do not impact the control data 226-a. In addition, these shifts may not impact recovery of the carrier of the individual control signals for synchronization (as discussed below), as the precision needed may be significantly less than is needed for the individual element signals. The control data 226-a may include information for each of the control circuits 215 (e.g., serial data), and the beam forming network 210-a may copy the control data 226-a (e.g., by dividing the composite multiplexed signal 241-a including the control signal 231-a carrying the control data 226-a) to each of the element signal ports 245 corresponding to each of the antenna elements 220. The individual element signals included in each individual output signal 246 at the respective element signal ports 245 may subsequently be adjusted by a corresponding control circuit 215 connected to the corresponding element signal port 245 and transmitted by a corresponding antenna element 220.

Each of the individual output signals 246 at the element signal ports 245 may include an individual element signal (e.g., a copy of the transmit beam signal 236-a) multiplexed with an individual control signal (e.g., a copy of the control signal 231-a). The individual control signal may be used by the corresponding control circuit 215 to apply an appropriate adjustment (e.g., amplitude and/or phase) to the corresponding individual element signal. That is, the beam forming network 210-a may divide the composite multiplexed signal 241-a to generate individual output signals 246 at each element signal port 245, which each include an individual control signal and an individual element signal. By multiplexing the beam signal and the control signal, the beam forming network 210-a may be used to generate and distribute the element signals and the control signals indicating control data for the corresponding element signal for each control circuit 215. In doing so, a single signal path may be used for both the control and the element signals for each antenna element in the beam forming network 210-a, rather than, for example, having separate dedicated control and element lines. Thus, PCB complexity, including a number PCB layers, may be reduced, lowering the manufacturing cost of the phased array antenna.

Each control circuit 215 may include a first port 248 (e.g., first port 248-a and first port 248-b) connected to a corresponding element signal port 245 of the beam forming network 210-a and a second port 249 (e.g., second port 249-a and second port 249-b) connected to a corresponding antenna element 220 (or, in some cases, multiple antenna elements 220). Each control circuit 215 may include a second routing circuit 250 (e.g., a diplexer or other multiplexer, or other type of signal routing circuit) that establishes an element signal path 251 (e.g., element signal path 251-a and element signal path 251-b) between the first port 248 and the second port 249 of the control circuit 215 and a control signal path 252 (e.g., control signal path 252-a and control signal path 252-b) between the first port 248 of the control circuit 215 and an adjustment circuit 265.

As shown in FIG. 2, each of the second routing circuits 250 is a diplexer that demultiplexes (e.g., via frequency demultiplexing) the received individual output signal into corresponding individual element and control signals. As correspondingly described with reference to the first routing circuit 205-a that multiplexes signals, the second routing circuit 250 may perform analogous inverse operations using analogous components to demultiplex the signals. For example, the second routing circuit 250-a may include a first bandpass filter 235-c and a second bandpass filter 235-d for the element signal and control signal, respectively. That is, the first bandpass filter 235-c may allow signals within a first frequency range to pass, where the first frequency range corresponds to at least a frequency range of the element signal (e.g., the modulated transmit beam signal). Although shown having a center frequency equal to $f_{tx}$, the center frequency of the first bandpass filter 235-c may not be the same as the carrier frequency $f_{tx}$ for the element signal, as long as the first frequency range allows the element signal to pass (e.g., while excluding the control signal 231-a). The second bandpass filter 235-d may allow signals within a second frequency range to pass, where the second frequency range corresponds to at least a frequency range of the control signal 231-a (e.g., the modulated control signal). Although shown having a center frequency equal to $f_c$, the center frequency of the second bandpass filter 235-d may not be the same as the carrier frequency $f_c$ for the control signal, as long as the second frequency range allows the control signal 231-a to pass (e.g., while excluding the element signal). Similarly, the second routing circuit 250-b may include a first bandpass filter 235-e and a second bandpass filter 235-f for the element signal and control signal, respectively. As described above with reference to the first routing circuit 205, other potential implementations may be used, including the use of other PCB traces, components including high- and low-pass filters, capacitors, inductors, and the like.

In the first control circuit 215-a, the control signal path 252-a may provide the control signal to a demodulator 255-a and an address decoder 260-a. The demodulator 255-a may demodulate the control signal carried on the control signal path 252-a to obtain control information. The control information may include commands for each of the control circuits 215 that are distributed to each of the control circuits 215 by the beam forming network 210-a. The commands for different control circuits 215 may be serially transmitted in the control information. That is, in addition to receiving its own control data, the control circuit 215-a may receive and demodulate the control information for each of the other control circuits 215 (e.g., for control circuit 215-b). The control information may include address information (e.g., in a header) identifying the address of the particular control circuit 215 for which the corresponding control information is intended. The address decoder 260-a may compare a known address (as further discussed below) of the control circuit 215-a to the address information in the control data 226-a to identify the control information that is intended for the particular control circuit 215-a, and provide the identified control information via a signal path 253-a to a corresponding adjustment circuit 265-a. The second control circuit 215-b may operate similarly to the first control circuit 215-a, the second control circuit 215-b similarly including a demodulator 255-b, an address decoder 260-b, and an adjustment circuit 265-b (e.g., to similarly provide identified control information via a signal path 253-b to the adjustment circuit 265-b).

Each of the adjustment circuits 265 (e.g., adjustment circuit 265-a and adjustment circuit 265-b) may include one or more circuit elements (e.g., one or more phase shifters 270, one or more amplifiers 275, etc.) to provide, based on the identified control information (e.g., beam coefficients, etc.), appropriate adjustments of amplitude and/or phase to the corresponding element signals. FIG. 2 shows a breakout view of the adjustment circuit 265-a. In the illustrated example, the adjustment circuit 265-a includes a phase shifter 270-a that applies a phase shift to the corresponding element signal as indicated by the control information. In the illustrated example, the adjustment circuit 265-a further includes an amplifier 275-a that amplifies the phase shifted signal from the phase shifter as indicated by the control information to produce an adjusted element signal. The adjusted element signal may be provided via the second port 249 of the control circuit 215 to the corresponding antenna element 220 for transmission. The adjustment circuit 265-a may operate similarly to adjust and provide the element signal to the second antenna element 220-b. The transmissions of the adjusted element signals by each of the antenna elements 220 of the phase array antenna together produce a transmit beam transmitted in a desired scan angle direction (e.g., in a direction of a target satellite, or other receiving device).

Different techniques for assigning addresses and techniques by which the address decoders 260 of each of the control circuits 215 may determine their correspondingly assigned addresses are described. In one example implementation, each of the control circuits 215 may be identical across the antenna array. As such, the particular control circuits 215 may not have preconfigured information or other differentiable information or features that could be used to determine their correspondingly assigned addresses prior to installation at their respective locations on the antenna array PCB. In this case, the various locations on the array antenna PCB may include different features indicating an addressing scheme across the array. These features may be used by the address decoders 260 to determine the addresses assigned to its corresponding control circuit 215.

In one example implementation, the addresses of the control circuits 215 may be set using pull-up/down or open/short address strapping. For example, a particular control circuit 215 may include multiple address pins and be placed at a particular location on the antenna array PCB. In some cases, a default configuration for the address pins may be pulled up (e.g., via an internal resistor of the control circuit 215) and, according to a location on the PCB, a unique combination of grounded vias may pull down particular address pins. For example, a first set of address pins may correspond to a row address of the control circuit 215 and a second set of pins may correspond to a column address of the control circuit 215. The resulting sequence of pulled up and pulled down address pins may then indicate the unique address for that control circuit 215.

Additionally or alternatively, each control circuit 215 may recognize its own address by reading address voltage levels, for example using an analog-to-digital converter (ADC). For example, as further described with reference to FIG. 8, voltage divider elements (e.g., resister voltage dividers) for each of the rows and columns may divide the supply voltage and corresponding row and column voltages may be read by ADCs at the control circuits 215. The antenna array PCB may include one voltage divider element per row that divides the supply voltage to a corresponding row voltage indicating a particular row and one voltage divider element per column that divides the supply voltage to a corresponding column voltage indicating the column. Each control circuit 215 may then include a row address pin that receives the corresponding row voltage and a column address pin that receives the corresponding column voltage. ADCs may then be used to read these voltages at the row and column address pins. Doing so may reduce a number of resistors to be used versus some other techniques. In addition, this described implementation may use a relatively lower pin-count versus using pull-up/down or open/short address strapping, which may reduce PCB area or cost for each control circuit 215.

In some cases, the addresses of the control circuits 215 may be selected (e.g., using sequential row and column addresses) such that if a control circuit applies control information (e.g., particular beam adjustment coefficients for amplitude and/or phase) for an incorrectly decoded address, the control information applied by the control circuit is likely intended for one of the adjacent control circuits 215. In some cases, the row and column addressing may ensure that the addresses of successive rows or columns do not differ by more than one bit (e.g., a Hamming distance equal to one (1)), and that any two rows or columns that are not consecutive have more than one bit that is different (e.g., a Hamming distance greater than one (1)). In this case, if a control circuit 215 incorrectly decodes the address as a result of a single-bit error, the control circuit 215 would apply an adjustment (e.g., of phase and/or amplitude) intended for its nearest neighboring control circuit 215 by row and/or column, which may not substantially degrade the RF beam forming performance of some antenna arrays. For example, this may be a similar performance as a group of antenna elements of the antenna array being twice as large as if the wrong address were not used in the antenna array. In some cases, the address of the control data may be encoded with one or more error correction bits to reduce the likelihood of incorrect address decoding. For example, the address of the control data may be transmitting according to a linear block code such as a Hamming code, Reed-Solomon code, and the like.

In some cases, the control circuits 215 and the controller 225-a may support bi-directional communication. For example, each of the control circuits 215 may also have a modulator (not shown), which may be part of the demodulator 255, or a separate component. Controller 225-a may send a command to read a configured value (e.g., control information) from one of the control circuits 215, and the addressed control circuit 215 may then respond by modulating a signal with the response (e.g., the configured value) and multiplexing the modulated signal onto the individual output signal 246 at the respective element signal port 245. The modulated signal may then be carried via the beam forming network 210-a and the first routing circuit 205-a to the controller 225-a, which may then demodulate the signal and decode the response. Thus, bi-directional communication may allow for checking a configuration of the control circuits 215, or reading other status information from the control circuits 215 for testing or debugging purposes.

In some cases, the demodulators 255 may recover the carrier (e.g., a carrier for the control signal) to generate a clock signal to synchronize the different control circuits 215. For example, the demodulator 255-a may use a carrier-recovery loop or other carrier recovery techniques (e.g., compensating for frequency and/or phase differences between the control signal carrier and a local oscillator). The demodulator 255-a may then set a clock signal based on the recovered waveform. In this way, the clock signal may be synchronized between each of the control circuits 215 of the phased array antenna. Thus, the control signal may use coherent modulation, and the synchronized clock signals at the demodulators 255 may use coherent demodulation to demodulate the control signal 231-a.

Figure 3:
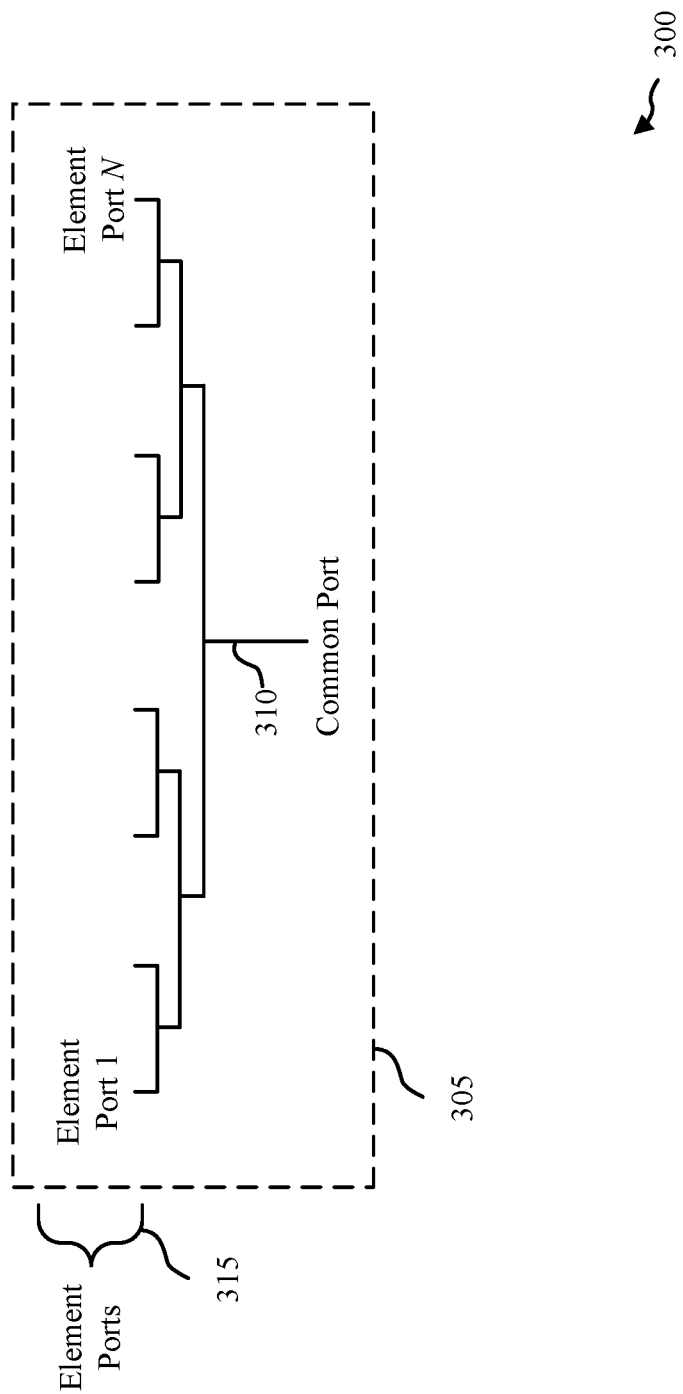
FIG. 3 shows an example diagram of a beam forming network for a circuit architecture for distributed multiplexed control and element signals for a phased array antenna in accordance with aspects of the present disclosure.

FIG. 3 shows an example diagram 300 of a beam forming network 305 for a circuit architecture for distributed multiplexed control and element signals for a phased array antenna in accordance with aspects of the present disclosure. The beam forming network shown in FIG. 3 may be an example of the beam forming networks described at least with reference to FIGS. 2 and 4 through 7.

The beam forming network 305 shows a common port 310, which may be an example of the input common signal port as described with reference to FIG. 2. The beam forming network 305 also shows several element ports 315, labeled "Element Port 1" to "Element Port N," which may correspond to a number of control circuits 1 to N, as described with reference to FIG. 2. The element ports 315 may be examples of the element signal ports as described with reference to FIG. 2.

The example diagram 300 of the beam forming network 305 shows three stages of combiner/dividers (e.g., PCB combiner/dividers formed in a PCB). That is, an input signal received at the common port 310 may be divided a first time to two signals, then each signal may be divided two more times in sequence to generate output signals at the eight shown element ports 315. Conversely, signals received at the eight element ports 315 may be combined by the beam forming network 305 to form a combined signal at the common port 310. In some cases, these combiner/dividers may be equal-way and/or unequal way, in-phase and/or out-of-phase, or any combination. It is to be appreciated, however, is just one example network of PCB combiner/dividers, and that the beam forming network 305 may include either fewer or a greater number of such combiner/dividers in various configurations.

Figure 4:
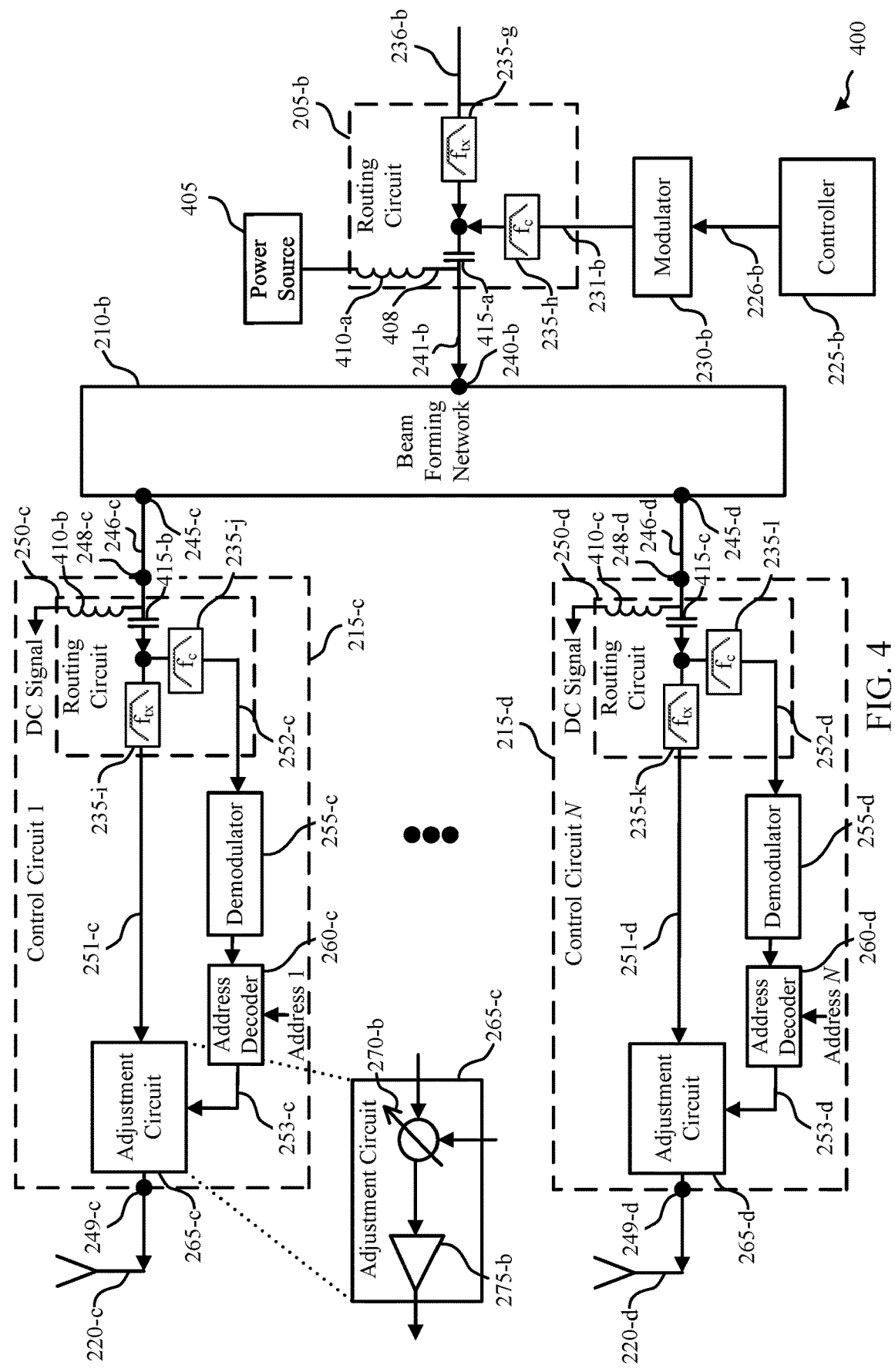
FIGS. 4-6 illustrate example diagrams of circuit architectures for distributed multiplexed control and element signals for phased array antennas in accordance with aspects of the present disclosure.

FIG. 4 illustrates an example diagram 400 of a circuit architecture for distributed multiplexed control and element signals for a phased array antenna in accordance with aspects of the present disclosure. The phased array antenna may be an example of one or more of the antenna arrays 140, as described with reference to FIG. 1, and the circuit architecture for distributed multiplexed control and element signals for a phased array antenna as described with reference to FIG. 2. The phased array antenna of FIG. 4 may be an example of a transmit phased array antenna for transmitting communication signals to the satellite 105, as described with reference to FIG. 1, and the circuit architecture for distributed multiplexed control and element signals for a phased array antenna as described with reference to FIG. 2.

The circuit architecture for the phased array antenna in FIG. 4 may operate in substantially the same way with similar or corresponding components as described with reference to FIG. 2, except as otherwise described herein. In FIG. 4, the phased array antenna, in additional to carrying beam, element, and control signals, includes a power source 405 that generates a power signal 408 that may be carried on the signal paths and multiplexed with the beam, element, and control signals.

As shown in FIG. 4, the circuit architecture includes a first routing circuit 205-b, a beam forming network 210-b, multiple control circuits 215, and multiple antenna elements 220. In the example of FIG. 4, a first control circuit 215-c and a corresponding first antenna element 220-c and a second control circuit 215-d and a corresponding second antenna element 220-d are shown. It should be appreciated, however, that any number N of control circuits 215 for antenna elements 220 may be implemented similarly. As illustrated in FIG. 4, there is a one-to-one correspondence between control circuits 215 and antenna elements 220 (i.e., there is a different control circuit 215 connected to each antenna element 220). However, it is to be appreciated that in some cases one control circuit 215 may be shared among multiple antenna elements 220 (i.e., one control circuit 215 may be connected to, and provide respective signaling to, multiple antenna elements 220). Each of the components may be connected via signal paths.

The first routing circuit 205-b (e.g., a diplexer or other multiplexer, or other type of signal routing circuit) may receive a transmit beam signal 236-b from, for example, a transmission processor, to be transmitted as a transmit beam by the phased array antenna. The first routing circuit 205-b may further receive control data 226-b from a controller 225-a. The control data 226-b may indicate adjustment values (e.g., amplitude and/or phase) for one or more of the N control circuits 215 to be applied by respective control circuits to transmit the transmit beam in a desired scan angle direction.

The phased array antenna may include a modulator 230-b that modulates the control data 226-b to produce a control signal 231-b. The modulator 230-b may modulate the control data 226-b received from the controller 225-b and pass the modulated control signal 231-b to the first routing circuit 205-b. In some cases, the modulator 230-b may be implemented within or as a component of the controller 225-b. The multiplexer of the first routing circuit 205-b may multiplex the transmit beam signal 236-b (having a center frequency $f_{tx}$) and the control signal 231-b (having a center frequency $f_c$) to generate a composite multiplexed signal 241-b including the transmit beam signal 236-b and the control signal 231-b. In FIG. 4, the first routing circuit 205-b is a diplexer including two bandpass filters 235—one for each input. The first bandpass filter 235-g may allow signals within a first frequency range to pass, where the first frequency range corresponds to at least a frequency range of the transmit beam signal 236-b (e.g., the modulated transmit beam signal). Although shown having a center frequency equal to $f_{tx}$, the center frequency of the first bandpass filter 235-g may not be the same as the carrier frequency $f_{tx}$ for the transmit beam signal, as long as the first frequency range allows the transmit beam signal 236-b to pass (e.g., while excluding the control signal 231-b). The second bandpass filter 235-h may allow signals within a second frequency range to pass, where the second frequency range corresponds to at least a frequency range of the control signal 231-b (e.g., the modulated control signal). Although shown having a center frequency equal to $f_c$, the center frequency of the second bandpass filter 235-h may not be the same as the carrier frequency $f_c$ for the control signal, as long as the second frequency range allows the control signal 231-b to pass (e.g., while excluding the transmit beam signal 236-b). Different possible implementations for the first routing circuit 205-b may be used, as described above.

The first routing circuit 205-b may further receive the power signal 408 from the power source 405. In FIG. 4, the power source 405 (e.g., a DC source, or otherwise a voltage source or a current source) produces the power signal 408 (e.g., a DC signal). The power signal 408 may pass through an inductor 410-a (or another type of choke element) within the first routing circuit 205-b. The inductor may block the control signal 231-b and the transmit beam signal 236-b from flowing through the signal path to the power source 405. The first routing circuit 205-b may further include a blocking capacitor 415-a that blocks the power signal 408 from the signal paths of the beam signal 236-b and control signal 231-b. The first routing circuit 205-b may output a composite multiplexed signal 241-b including each of the transmit beam signal 236-b, the control signal 231-b, and the power signal 408.

The first routing circuit 205-b may provide the composite multiplexed signal 241-b, including the transmit beam signal 236-b multiplexed with the control signal 231-b, to the common signal port 240-b of the beam forming network 210-b. The beam forming network 210-b may include one or more stages of PCB dividers that divide the composite multiplexed signal 241-b to produce individual output signals 246 (e.g., output signal 246-c and output signal 246-d) at corresponding output element signal ports 245 (e.g. element signal port 245-c and element signal port 245-d) of the beam forming network 210-b. That is, the beam forming network 210-b may divide the composite multiplexed signal 241-b into individual output signals 246, each individual output signal 246 including an individual element signal and an individual control signal that are copies of the transmit beam signal 236-b and the control signal 231-b respectively. The one or more stages of PCB dividers may provide relative amplitude and/or phase shifts between the individual element signals of the individual output signals 246 as part of the overall beamforming of the phased array antenna. In such a case, the individual control signals of the individual output signals 246 may also experience relative amplitude and/or phase shifts due to the one or more stages of PCB dividers. However, such relative shifts in amplitude and/or phase shifts are applied to the carriers of the individual control signals and thus do not impact the control data 226-$b$. In addition, these shifts may not impact recovery of the carrier of the individual control signals for synchronization (as discussed below), as the precision needed may be significantly less than is needed for the individual element signals. The control data 226-$b$ may include information for each of the control circuits 215 (e.g., serial data), and the beam forming network 210-$b$ may copy the control data 226-$b$ received at the common signal port 240-$b$ (e.g., by dividing the composite multiplexed signal 241-$b$ including the control signal 231-$a$ carrying the control data 226-$b$) to each of the element signal ports 245 corresponding to each of the antenna elements 220. The individual element signals included in each individual output signal 246 at the respective element signal ports 245 may subsequently be adjusted by a corresponding control circuit 215 connected to the corresponding element signal port 245 and transmitted by a corresponding antenna element 220.

Each of the individual output signals 246 at the element signal ports 245 may include an individual element signal (e.g., a copy of the transmit beam signal 236-$b$) multiplexed with an individual control signal (e.g., a copy of the control signal 231-$b$), and the power signal 408. The control signal may be used by the corresponding control circuit 215 to apply appropriate adjustment (e.g., amplitude and/or phase) to the corresponding element signal. That is, the beam forming network 210-$b$ may divide the composite multiplexed signal 241-$b$ to generate individual control signals and individual element signals at each element signal port 245. The individual control signals may be multiplexed with the corresponding element signals to form the multiplexed individual output signals 246. By multiplexing the beam signal and the control signal, the beam forming network 210-$b$ may be used to generate and distribute the element signals and the control signals indicating control data for the corresponding element signal for each control circuit 215.

Each control circuit 215 may include a first port 248 (e.g., first port 248-$c$ and first port 248-$d$) connected to a corresponding element signal port 245 of the beam forming network 210-$b$ and a second port 249 (e.g., second port 249-$c$ and second port 249-$d$) connected to a corresponding antenna element 220. Each control circuit 215 may include a second routing circuit 250 (e.g., a diplexer or other multiplexer, or other type of signal routing circuit) that establishes an element signal path 251 (e.g., element signal path 251-$c$ and element signal path 251-$d$) between the first port 248 and the second port 249 of the control circuit 215 and a control signal path 252 (e.g., control signal path 252-$c$ and control signal path 252-$d$) between the first port 248 of the control circuit 215 and an adjustment circuit 265.

As shown in FIG. 4, each of the second routing circuits 250 is a diplexer that demultiplexes the received individual output signal into corresponding individual element and control signals. As correspondingly described with reference to the first routing circuit 205-$b$ that multiplexes signals, the second routing circuits 250 may perform analogous inverse operations using analogous components to demultiplex the signals. For example, the second routing circuit 250-$c$ may include a first bandpass filter 235-$i$ and a second bandpass filter 235-$j$ for the element signal and control signal, respectively. Similarly, the second routing circuit 250-$d$ may include a first bandpass filter 235-$k$ and a second bandpass filter 235-$l$ for the element signal and control signal, respectively. Although shown having a center frequency equal to $f_{ex}$, the center frequency of the first bandpass filters 235-$i$ and 235-$k$ may not be the same as the carrier frequency $f_{ex}$ for the transmit beam signal, as long as they allow the element signal to pass (e.g., while excluding the control signal). Similarly, the center frequency of the second bandpass filters 235-$j$ and 235-$l$ are shown as equal to $f_c$, but may not be the same as the carrier frequency $f_c$ for the control signal, as long as they allow the control signal to pass (e.g., while excluding the element signal). Different possible implementations for the second routing circuits 250 may be used, as described above, including, for example, the use of other PCB traces, components including high- and low-pass filters, capacitors, inductors, and the like.

In some cases, each of the control circuits 215 may include a decoupler that decouples the multiplexed power signal to obtain the power signal for supplying power to control circuits 215 and other components. The second routing circuits 250 within each of the control circuits 215 may include inductors 410 (e.g., inductor 410-$b$ and inductor 410-$c$), or another type of choke element, that allows the power signal to pass, which may then be provided to various other components of the control circuit 215 to provide the other components power. The second routing circuits 250 may further include blocking capacitors 415 (e.g., capacitor 415-$b$ and capacitor 415-$c$) that block the power signal 408 from the signal paths to the respective antenna elements 220.

In, for example, the first control circuit 215-$c$, the control signal path 252-$c$ may provide the control signal to a demodulator 255-$c$ and an address decoder 260-$c$. The demodulator 255-$c$ may demodulate the control signal carried on the control signal path 252-$c$ to obtain control information. The control information may include commands for each of the control circuits 215 that are distributed to each of the control circuits 215 by the beam forming network 210-$b$. The commands for different control circuits 215 may be serially transmitted in the control information. That is, in addition to receiving its own control data, the control circuit 215-$c$ may receive and demodulate the control information for each of the other control circuits 215 (e.g., for control circuit 215-$d$). The control information may include address information (e.g., in a header) identifying the address of the particular control circuit 215 for which the corresponding control information is intended. The address decoder 260-$c$ may compare a known address (as further discussed below) of the control circuit 215-$c$ to the address information in the control data 226-$b$ to identify the control information that is intended for the particular control circuit 215-$c$, and provide the identified control information via a signal path 253-$c$ to a corresponding adjustment circuit 265-$c$. The second control circuit 215-$d$ may operate similarly to the first control circuit 215-$c$, the second control circuit 215-$b$ similarly including a demodulator 255-$d$, an address decoder 260-$d$, and an adjustment circuits 265-$d$ (e.g., to similarly provide identified control information via a signal path 253-$d$ to the adjustment circuit 265-$d$).

Each of the adjustment circuits 265 (e.g., adjustment circuit 265-$c$ and adjustment circuit 265-$d$) may include one or more circuit elements (e.g., one or more phase shifters 270, one or more amplifiers 275, etc.) to provide, based on the identified control information, appropriate adjustments of amplitude and/or phase to the corresponding element signals. FIG. 4 shows a breakout view of the adjustment circuit 265-$c$. In the illustrated example, the adjustment circuit 265-*c* includes a phase shifter 270-*b* that applies a phase shift to the corresponding element signal as indicated by the control information. In the illustrated example, the adjustment circuit 265-*c* further includes an amplifier 275-*b* that amplifies the phase shifted signal from the phase shifter as indicated by the control information to produce an adjusted element signal. The adjusted element signal may be provided via the second port 249 of the control circuit 215 to the corresponding antenna element 220 for transmission. The transmissions of the adjusted element signals by each of the antenna elements 220 of the phase array antenna together produce a transmit beam transmitted in a desired scan angle direction.

In some cases, each of the control circuits 215 may include multiple sets of beamforming registers. In some examples, each of the control circuits 215 includes double buffered beamforming registers so the next adjustment values for the next upcoming beam pointing state (i.e., an upcoming beam direction for the transmit beam) can be loaded while operating in the current state. This may allow the phased array antenna to change pointing directions relatively quickly, for example, in situations in which the phased array antenna is to alternate its pointing direction between two different receiving devices (e.g., for satellite handover). Further, this may facilitate the phased array antenna to maintain its tracking direction of a receiving device in the case in which beam-forming coefficients are frequency dependent and frequency hopping is performed, for example, to maintain the beam direction while alternating between two different frequency bands. In some examples, each of the control circuits may include multiple sets of registers to store coefficients for beams used for mispointing correction (e.g., via step track, conical scan, monopulse tracking). For example, each of the control circuits may store sets of coefficients associated with a conical scan operation relative to the current beam. The conical scan may intentionally point the antenna beam away from the target direction according to different angular offsets and measure a signal attribute (e.g., via a received signal or feedback indicating a signal strength of a transmitted signal), adjusting the antenna beam to a new target direction if an improved signal attribute is found at a scan offset. As each mispointing correction operation is performed and a new beam directed to the target is selected as a result of the conical scan, the sets of coefficients may be updated with new sets of coefficients for the next conical scan operation. In some cases, a portion (e.g., 10 bits) of the address headers may be reserved and used as global commands such as "transmit enable/disable" and/or "receive enable/disable," commands to enable buffered beam weights from particular registers (e.g., registers A and B for double-buffered beamforming registers), and other commands for the phased array antenna.

In some cases, the control circuits 215 and the controller 225-*b* may support bi-directional communication. For example, each of the control circuits 215 may also have a modulator (not shown), which may be part of the demodulators, or separate components. Controller 225-*b* may send a command to read a configured value (e.g., control information) from one of the control circuits 215, and the addressed control circuit 215 may then respond by modulating a signal with the response (e.g., the configured value) and multiplexing the modulated signal onto the individual output signals 246 at the respective element signal port 245. The modulated signal may then be carried via the beam forming network 210-*b* and the first routing circuit 205-*b* to the controller 225-*b*, which may then demodulate the signal and decode the response. Thus, bi-directional communication may allow for checking a configuration of the control circuits 215, or reading other status information from the control circuits 215 for testing or debugging purposes.

In some cases, the demodulators 255 may recover the carrier (e.g., a carrier for the control signal) to generate a clock signal to synchronize the different control circuits 215. For example, the demodulator 255-*e* may use a carrier-recovery loop or other carrier recovery techniques (e.g., compensating for frequency and/or phase differences between the control signal carrier and a local oscillator). The demodulator 255-*e* may then set a clock signal based on the recovered waveform. In this way, the clock signal may be synchronized between each of the control circuits 215 of the phased array antenna. Thus, the control signal may use coherent modulation, and the synchronized clock signals at the demodulators 255 may use coherent demodulation to demodulate the control signal 231-*b*.

Figure 5:
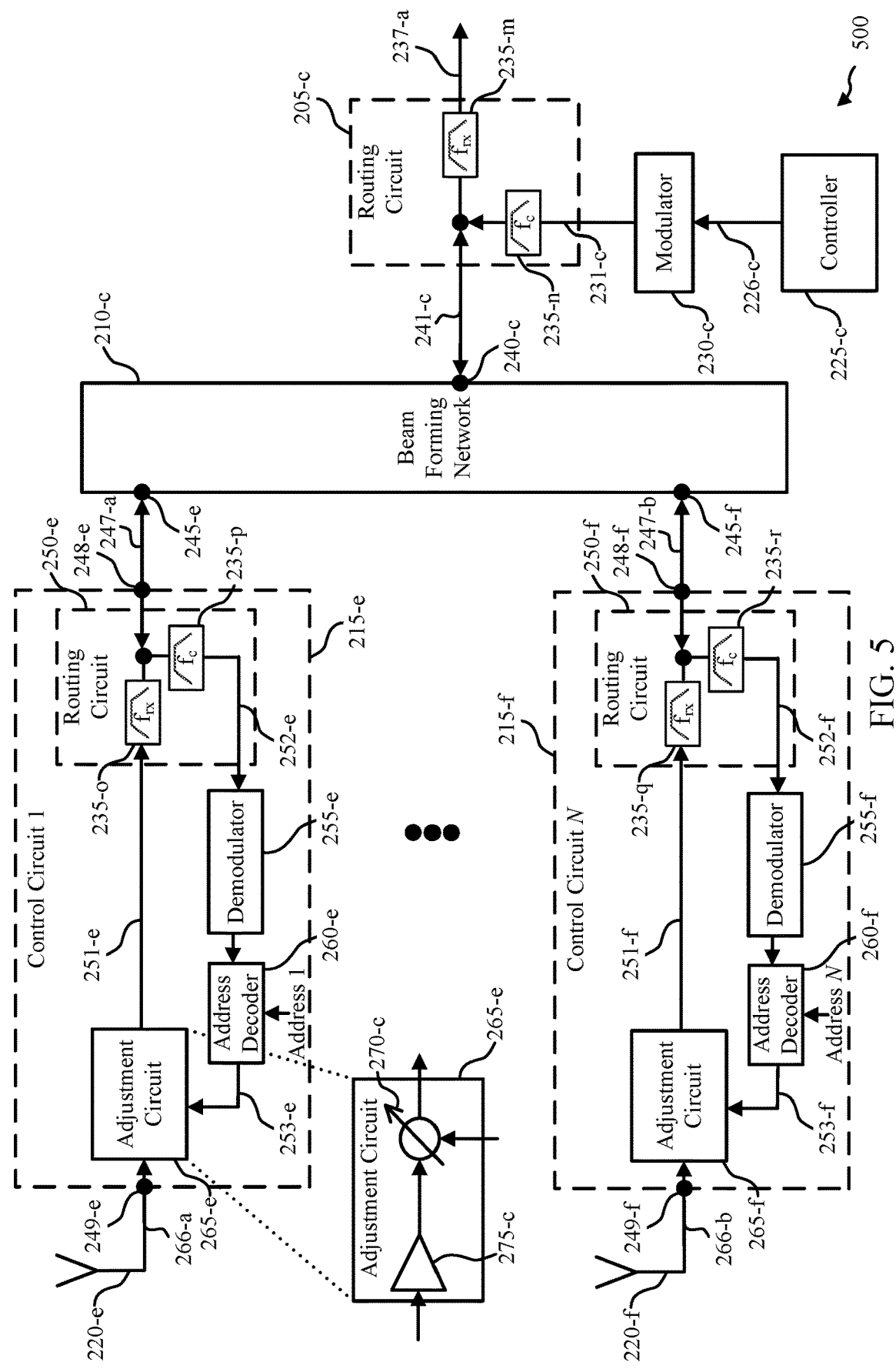

FIG. 5 illustrates an example diagram 500 of a circuit architecture for distributed multiplexed control and element signals for a phased array antenna in accordance with aspects of the present disclosure. The phased array antenna may be an example of one or more of the antenna arrays 140, as described with reference to FIG. 1. The phased array antenna of FIG. 5 may be an example of a receive phased array antenna for receiving communication signals from the satellite 105, as described with reference to FIG. 1.

The circuit architecture for the phased array antenna in FIG. 5 may operate in a substantially similar way with similar or corresponding components as described with reference to FIGS. 2 through 4, except as otherwise described herein. Although not illustrated, in some cases the phased array antenna of FIG. 5 may produce and pass a power signal as similarly described with reference to FIG. 4, for example. The phased array antenna in FIG. 5 is an example of a receive phased array antenna rather than the transmit phased array antennas described in FIGS. 2 and 4. In the receive phased array antenna, the element signals are received at the antenna elements 220, and proceed through the signal paths in the opposite direction of transmit signals. That is, the antenna elements 220 may receive corresponding receive element signals 266 (e.g., receive element signal 266-*a* and receive element signal 266-*b*) from a transmitting device (e.g., a satellite), which may be provided through the corresponding control circuits 215 to the beam forming network 210-*c*. The beam forming network 210-*c* may combine these element signals to create a receive beam signal, which may be passed through the first routing circuit 205-*c* to the processor and other devices at the airplane (or other vehicle) on which the phase array antenna is mounted.

As shown in FIG. 5, the circuit architecture includes a first routing circuit 205-*c*, a beam forming network 210-*c*, multiple control circuits 215, and multiple antenna elements 220. In the example of FIG. 5, a first control circuit 215-*e* and a corresponding first antenna element 220-*e* and a second control circuit 215-*f* and a corresponding second antenna element 220-*f* are shown. It should be appreciated, however, that any number N of control circuits 215 for antenna elements 220 may be implemented similarly. As illustrated in FIG. 5, there is a one-to-one correspondence between control circuits 215 and antenna elements 220 (i.e., there is a different control circuit 215 connected to each antenna element 220). However, it is to be appreciated that in some cases one control circuit 215 may be shared among multiple antenna elements 220 (i.e., one control circuit 215 may be connected to, and receive respective signaling from, multiple antenna elements 220). Each of the components may be connected via signal paths.

As described herein, the control circuits 215, beam forming network 210-c, first routing circuit 205-c, controller 225-a, and each of the other components and signal paths may support bi-directional communication. For example, as described above, each of the control circuits 215 may also include modulators (not shown), which may be part of the demodulators 255, or separate components. Controller 225-c may send a command to read a configured value (e.g., control information) from one of the control circuits 215, and the addressed control circuit 215 may then respond by modulating a signal with the response (e.g., the configured value) and multiplexing the modulated signal onto the individual output signals at the respective element signal ports 245 of the beam forming network 510-c. The modulated signal may then be carried via the beam forming network 210-c and the first routing circuit 205-c to the controller 225-a, which may then demodulate the signal and decode the response. Thus, bi-directional communication may allow for checking a configuration of the control circuits 215, or reading other status information from the control circuits 215 for testing or debugging purposes. Additionally, in the case of the receive phased array antenna, bi-directional communication may support signal paths carrying control signals in one direction, and providing a receive element signal in the opposite direction.

In the receive phased array antenna, the antenna elements 220 may receive respective receive element signals 266 from a transmitting device (e.g., a satellite), and provide the receive element signals to the control circuits 215. As described above, each control circuit 215 may include a first port 248 (e.g., first port 248-e and first port 248-f) connected to a corresponding element signal port 245 of the beam forming network 210-c and a second port 249 (e.g., second port 249-e and second port 249-f) connected to the corresponding antenna element 220. Each control circuit 215 may include a second routing circuit 250 (e.g., a diplexer or other multiplexer, or other type of signal routing circuit) that establishes an element signal path 251 (e.g., element signal path 251-e and element signal path 251-f) between the first port 248 and the second port 249 of the control circuit 215 and a control signal path 252 (e.g., control signal path 252-e and control signal path 252-f) between the first port 248 of the control circuit 215 and an adjustment circuit 265.

An adjustment may be applied to the receive element signals at the adjustment circuits 265 to generate adjusted element signals, as described below. Each second routing circuit 250 may provide the corresponding adjusted element signal (having a center frequency $f_{rx}$) from the corresponding adjustment circuit 265 to the corresponding first port 248, while also providing the control signal (having a center frequency $f_c$) from the corresponding first port 248 to the corresponding control signal path 252. As such, the signal path between the corresponding first port 248 and a corresponding element signal port 245 of the beam forming network 210-c contains a multiplexed signal including the adjusted element signal and the control signal. In FIG. 5, each of the second routing circuits 250 is a diplexer including two bandpass filters 235—one for each of the signals. For example, in the second routing circuit 250-e, a first bandpass filter 235-o may allow signals of a first frequency range to pass, where the first frequency range corresponds to at least the frequency range of the receive element signal. For example, the receive element signal may be modulated receive signal including a modulating signal modulated with the carrier $f_{rx}$ for the receive element signal. Although shown having a center frequency equal to $f_{rx}$, the center frequency of the first bandpass filter 235-o may not be the same as the carrier frequency $f_{rx}$ for the receive element signal, as long as the first frequency range allows the receive element signal to pass (e.g., while excluding the control signal). A second bandpass filter 235-p may allow a second frequency range to pass, where the second frequency range corresponds to at least the frequency range of the control signal (e.g., the modulated control signal). Although shown having a center frequency equal to $f_c$, the center frequency of the second bandpass filter 235-p may not be the same as the carrier frequency $f_c$ for the control signal, as long as the second frequency range allows the control signal to pass (e.g., while excluding the receive element signal). Similarly, the second routing circuit 250-f may include a first bandpass filter 235-q and a second bandpass filter 235-r for the element signal and control signal, respectively.

In, for example, the first control circuit 215-e, the control signal path 252-e may provide the control signal to a demodulator 255-e and an address decoder 260-e. The demodulator 255-e may demodulate the control signal carried on the control signal path 252-e to obtain control information. The control information may include commands for each of the control circuits 215 (e.g., serial data) that are copied to each of the control circuits 215 by the beam forming network 210-c. That is, in addition to receiving its own control data, the control circuit 215-e may receive and demodulate the control information for each of the other control circuits 215 (e.g., for control circuit 215-f). The control information may include address information (e.g., in a header) identifying the address of the particular control circuit 215 for which the corresponding control information is intended. The address decoder 260-e may compare a known address (as further discussed below) of the control circuit 215-e to the address information in the control data 226-c to identify the control information that is intended for the particular control circuit 215-e, and provide the identified control information via a signal path 253-e to a corresponding adjustment circuit 265-e. The second control circuit 215-f may operate similarly to the first control circuit 215-e, the second control circuit 215-f similarly including a demodulator 255-f, an address decoder 260-f, and an adjustment circuits 265-f (e.g., to similarly provide identified control information via a signal path 253-f to the adjustment circuit 265-f).

Each of the adjustment circuits 265 (e.g., adjustment circuit 265-e and adjustment circuit 265-f) may include one or more circuit elements (e.g., one or more phase shifters 270, one or more amplifiers 275, etc.) to provide, based on the identified control information, appropriate adjustments of amplitude and/or phase to the corresponding individual receive element signals to generate individual adjusted element signals. FIG. 5 shows a breakout view of the adjustment circuit 265-e. In the illustrated example, the adjustment circuit 265-e includes a phase shifter 270-c that applies a phase shift to the corresponding receive element signal as indicated by the control information. In the illustrated example, the adjustment circuit 265-e further includes an amplifier 275-e that first amplifies the individual receive element signal as indicated by the control information prior to the phase shifter applying the phase shift. The adjustments may be applied to the receive element signal 266-a to produce an adjusted element signal. The adjusted element signal may be provided to the second routing circuit 250-e, as described above.

The second routing circuits 250 may provide the adjusted element signal bi-directionally multiplexed with the control signal to an element signal port 245 (in this case, an input port with respect to the element signal and an output port with respect to the control signal) of the beam forming network 210-c. The beam forming network 210-a may include one or more stages of PCB combiner/dividers that combine the individual element signals to provide a receive beam signal at a common signal port 240-c. In the other direction, the first routing circuit 205-a may provide a control signal 231-c to the common signal port 240-c of the beam forming network 210-c. The beam forming network 210-c may copy the control signal 231-c containing the control data 226-c received at the common signal port 240-c to each of the element signal ports 245 corresponding to each of the antenna elements 220. The beam forming network 210-c may accordingly generate the individual control signals in the individual combined (or multiplexed) signals 247 (e.g., combined signal 247-a and combined signal 247-b) at element signal ports 245 (e.g., element signal port 245-e and element signal port 245-f) of the beam forming network 210-c.

In sum, each bi-directional combined signal 247 at the respective element signal ports 245 may include an individual receive element signal as an input to the beam forming network 210-c from the control circuits 215 and an individual control signal (e.g., a copy of the control signal 231-c) as an output from the beam forming network 210-c to the control circuits 215. The bi-directional combined signal at the common signal port 240-c may include a composite receive beam signal as an output of the beam forming network 210-c to the first routing circuit 205-c and a copy of the control signal 231-c as an output from the first routing circuit 205-c to the beam forming network 210-c.

The first routing circuit 205-c may receive the receive beam signal from the beam forming network 210-c. The first routing circuit 205-a may further receive control data 226-c from the controller 225-c. The control data 226-a may indicate the adjustment values (e.g., amplitude and/or phase) to be applied by the adjustment circuits 265, as described herein, to receive the receive beam at a desired scan angle direction.

The phased array antenna may include a modulator 230-c that modulates the control data 226-c to produce the control signal 231-c. The modulator 230-c may modulate the control data 226-c received from the controller 225-c and pass the modulated control signal 231-c to the first routing circuit 205-c. In some cases, the modulator 230-c may be implemented within or as a component of the controller 225-c. The multiplexer of the first routing circuit 205-c may receive the receive beam signal from the beam forming network 210-c and receive the control signal 231-c (having a center frequency fc) from modulator 230-c. As such, the signal path between the first routing circuit 205-c and the beam forming network 210-c contains a composite multiplexed signal 241-c including the receive beam signal and the control signal 231-c. The first routing circuit 205-c may then send a receive beam signal 237-a to, for example, a reception processor to process the information received by the phased array antenna.

As shown in FIG. 5, the first routing circuit 205-c is implemented as a diplexer including two bandpass filters 235. A first bandpass filter 235-m may allow signals of a first frequency range to pass, where the first frequency range corresponds to at least a frequency range of the receive beam signal. For example, the receive beam signal may be a modulated receive beam signal including a modulating signal modulated with the carrier $f_{rx}$ for the receive beam signal. Although shown having a center frequency equal to $f_{rx}$, the center frequency of the first bandpass filter 235-m may not be the same as the carrier frequency $f_{rx}$ for the receive beam signal, as long as the first frequency range allows the receive beam signal to pass (e.g., while excluding the control signal). The second bandpass filter 235-n may allow signals of a second frequency range to pass, where the second frequency range corresponds to at least the frequency range of the control signal 231-c (e.g., the modulated control signal). Although shown having a center frequency equal to $f_c$, the center frequency of the second bandpass filter 235-n may not be the same as the carrier frequency $f_c$ for the control signal, as long as the second frequency range allows the control signal to pass (e.g., while excluding the receive beam signal). Different possible implementations for the first routing circuit 205-c may also be used, as described above.

Figure 6:
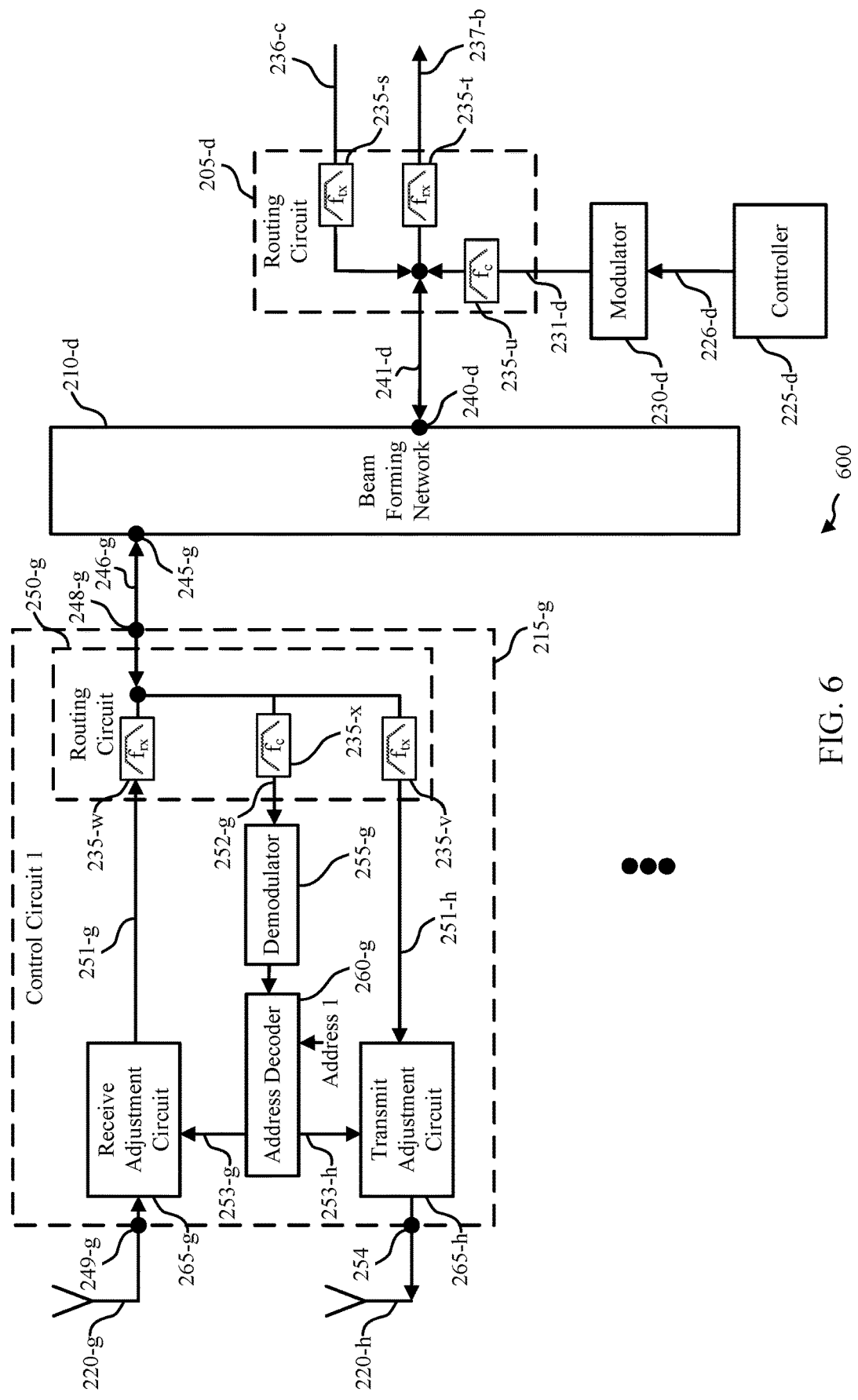

FIG. 6 illustrates an example diagram 600 of a circuit architecture for distributed multiplexed control and element signals for a phased array antenna in accordance with aspects of the present disclosure. The phased array antenna may be an example of one or more of the antenna arrays 140, as described with reference to FIG. 1. The phased array antenna of FIG. 6 may be an example of a transmit/receive phased array antenna that may both transmit communication signals to and receive communication signals from the satellite 105, as described with reference to FIG. 1.

The circuit architecture for the phased array antenna in FIG. 6 may operate in a substantially similar way with similar or corresponding components as described with reference to FIGS. 2 through 5, except as otherwise described herein. While FIG. 6 shows only one control circuit 215-g, it is to be appreciated that like FIGS. 2 through 5, there may be any number N of control circuits 215.

As shown in FIG. 6, an antenna element 220-g is a receive antenna element 220 with a signal path connected to a receive adjustment circuit 265-g. An antenna element 220-h is a transmit antenna element 220 with a signal path connected to a transmit adjustment circuit 265-h. It should be appreciated that while FIG. 6 shows a separate transmit antenna element 220 and receive antenna element 220, a single antenna element 220 may be used for both transmission and reception.

As shown in FIG. 6, the circuit architecture includes a first routing circuit 205-d, a beam forming network 210-d, a control circuit 215-g, and multiple antenna elements 220. In the example of FIG. 6, the control circuit 215-a and corresponding receive antenna element 220-g and transmit antenna element 220-h are shown. It should be appreciated, however, that any number N of control circuits 215 for antenna elements 220 may be implemented similarly. As illustrated in FIG. 6, there is a one-to-two correspondence between control circuits 215 and antenna elements 220. However, it is to be appreciated that in some cases one control circuit 215 may be shared among multiple receive and transmit antenna elements 220 (i.e., one control circuit 215 may be connected to, and receive respective signaling from multiple receive antenna elements 220 or provide signaling to multiple transmit antenna elements 220). Each of the components may be connected via signal paths.

The first routing circuit 205-d (e.g., a diplexer or other multiplexer, or other type of signal routing circuit) may receive a transmit beam signal 236-c from, for example, a transmission processor, to be transmitted as a transmit beam by the phased array antenna. The first routing circuit 205-d may receive a receive beam signal from the beam forming network 210-c as may have been received by the phased array antenna as described herein. The first routing circuit 205-*d* may further receive a control signal 231-*d* from a modulator 230-*d* that contains control data 226-*d* from a controller 225-*d*. The control data 226-*d* may indicate adjustment values (e.g., amplitude and/or phase) for one or more of the N control circuits 215 to be applied by respective control circuits to transmit the transmit beam signal and to receive the receive beam signal in desired scan angle directions.

The phased array antenna may include the modulator 230-*d* that modulates the control data 226-*d* to produce the control signal 231-*d*. The modulator 230-*d* may modulate the control data 226-*a* received from the controller 225-*d* and pass the modulated control signal 231-*d* to the first routing circuit 205-*d*. In some cases, the modulator 230-*d* may be implemented within or as a component of the controller 225-*d*. As mentioned above, the inputs to the first routing circuit 205-*d* may include the transmit beam signal 236-*c* (having a center frequency $f_{tx}$), the composite receive beam signal (having a center frequency $f_{rx}$), and the control signal 231-*d* (having a center frequency $f_c$). Thus, as shown in FIG. 6, the composite multiplexed signal 241-*d* is a bi-directional signal, with the control signal and transmit beam signal being in one direction (from the first routing circuit 205-*d* to the beam forming network 210-*d*) and the receive beam signal being in the opposite direction (from the beam forming network 210-*d* to the first routing circuit 205-*d*).

The first routing circuit 205-*d* may generate components of composite multiplexed signal 241-*d* including the transmit beam signal 236-*c* and the control signal 231-*d*. The composite multiplexed signal 241-*d* may be multiplexed over the composite receive beam signal traveling on the signal path in the other direction to the first routing circuit 205-*d* from the beam forming network 210-*c*. The first routing circuit 205-*d* may further send a receive beam signal 237-*b* to, for example, a reception processor to process the information received by the phased array antenna.

As shown in FIG. 6, the first routing circuit 205-*a* is a triplexer (or a combination of diplexers) including three bandpass filters 235—one for each respective signal. A first bandpass filter 235-*s* may allow signals within a first frequency range to pass, where the first frequency range corresponds to at least the frequency range of the transmit beam signal 236-*c* (e.g., the modulated transmit beam signal). Although shown having a center frequency equal to $f_{tx}$, the center frequency of the first bandpass filter 235-*s* may not be the same as the carrier frequency $f_{tx}$ for the transmit beam signal, as long as the first frequency range allows the transmit beam signal 236-*c* to pass (e.g., while excluding the control signal 231-*d* and the modulated receive beam signal). The second bandpass filter 235-*t* may allow a frequency band of a second frequency range to pass, where the second frequency range corresponds to at least the frequency range of the receive beam signal 237-*b* (e.g., the modulated receive beam signal). Although shown having a center frequency equal to $f_{rx}$, the center frequency of the second bandpass filter 235-*t* may not be the same as the carrier frequency $f_{rx}$ for the receive beam signal, as long as the second frequency range allows the receive beam signal 236-*a* to pass (e.g., while excluding the control signal and the transmit beam signal). The third bandpass filter 235-*u* may allow signals within a third frequency range to pass, where the third frequency range corresponds to at least the frequency range of the control signal 231-*d* (e.g., the modulated control signal). Although shown having a center frequency equal to $f_c$, the center frequency of the third bandpass filter 235-*u* may not be the same as the carrier frequency $f_c$ for the control signal, as long as the third frequency range allows the control signal to pass (e.g., while excluding the transmit beam signal and the receive beam signal). Different possible implementations for the first routing circuit 205-*d* may also be used, as described above.

The first routing circuit 205-*d* may provide the transmit beam signal 236-*c* multiplexed with the control signal 231-*d* to a common signal port 240-*d* of the beam forming network 210-*d*. In the reverse direction, the receive beam signal 237-*b* may also be multiplexed with the composite multiplexed signal 241-*d* and received by the first routing circuit 205-*d*. The beam forming network 210-*d* may include one or more stages of PCB combiner/dividers that divide the transmit components of composite multiplexed signal 241-*c* to produce individual output signals 246 at output element signal ports 245 of the beam forming network 210-*d*. That is, the beam forming network 210-*c* may divide the composite multiplexed signal 241-*c* into individual output signals 246 (e.g., individual output signal 246-*g*), each output signal 246 including an individual transmit element signal (e.g., a copy of transmit beam signal 236-*c*) and an individual control signal (e.g., a copy of control signal 231-*d*). The one or more stages of PCB dividers may provide relative amplitude and/or phase shifts between the individual element signals of the individual output signals 246 as part of the overall beamforming of the phased array antenna. In such a case, the individual control signals of the individual output signals 246 may also experience relative amplitude and/or phase shifts due to the one or more stages of PCB dividers. However, such relative shifts in amplitude and/or phase shifts are applied to the carriers of the individual control signals and thus do not impact the control data 226-*d*. In addition, these shifts may not impact recovery of the carrier of the individual control signals for synchronization (as discussed below), as the precision needed may be significantly less than is needed for the individual element signals. The control data 226-*d* may include information for each of the control circuits 215 (e.g., serial data), and the beam forming network 210-*d* may copy the control signal 231-*d* received at the common signal port 240-*d* to the element signal ports 245. The individual transmit element signal included in each individual output signal 246 at the respective element signal ports 245 may subsequently be adjusted by a corresponding control circuit 215 connected to the corresponding element signal port 245 and transmitted by a corresponding antenna element 220. Similarly, in the reverse direction, the beam forming network 210-*d* may combine individual adjusted element signals received at the element signal ports 245 to provide the receive beam signal 237-*b* at the common signal port 240-*d*.

The transmit and receive individual output signals 246-*g* at the element signal port 245-*g* may include the individual element signals (e.g., transmit and receive element signals) multiplexed with the individual control signal (e.g., a copy of the control signal 231-*d*). The control signal may be used by the corresponding control circuit 215 to apply appropriate adjustment (e.g., amplitude and/or phase) to the corresponding transmit and receive element signals. That is, the beam forming network 210-*c* may divide the composite multiplexed signal 241-*c* to generate individual control signals and individual transmit element signals at the element signal port 245-*g*. In the reverse direction and using the same stages of PCB combiner/dividers that divide the composite multiplexed signal 241-*d*, the beam forming network 210-*d* may combine individual receive element signals at the element signal ports 245 to provide the composite receive beam signal 237-*b* at the common signal port 240-*d*. The individual control signals may be multiplexed with the corresponding receive and transmit element signals to form the multiplexed individual output signal 246-g. By multiplexing the element signals and the control signal, the beam forming network 210-d may be used to generate and distribute the transmit element signals and the control signals indicating control data for each of the corresponding element signals for each antenna element 220 of the control circuit 215-g.

The control circuit 215-g may include a first port 248-g connected to the corresponding element signal port 245-g of the beam forming network 210-d, a second port 249-g connected to the receive antenna element 220-g, and a third port 254 connected to the transmit antenna element 220-h. The control circuit 215-g may include a second routing circuit 250-g (e.g., a triplexer or other multiplexer, or other type of signal routing circuit) that establishes a receive element signal path 251-g between the first port 248-g and the second port 249-g of the control circuit 215-g, a transmit element signal path 251-h between the first port 248-g and the third port 254 of the control circuit 215-g, and a control signal path 252-g between the first port 248-g of the control circuit 215-g and adjustment circuits 265 (e.g., receive adjustment circuit 265-g and transmit adjustment circuit 265-h).

As shown in FIG. 6, the second routing circuit 250-g is a triplexer that demultiplexes (e.g., via frequency demultiplexing) the transmit element signal and control signal into corresponding individual element and control signals. As correspondingly described with reference to the first routing circuit 205-d that multiplexes signals, the second routing circuit 250-g may perform analogous inverse operations using analogous components to demultiplex the signals. The second routing circuit 250-g may further receive an adjusted receive element signal from the receive antenna element 220-g via the receive adjustment circuit 265-g. The second routing circuit 250-g may include a first bandpass filter 235-v that may allow signals within a first frequency range to pass, where the first frequency range corresponds to at least the frequency range of the transmit element signal (e.g., the modulated transmit beam signal). Although shown having a center frequency equal to $f_{tx}$, the center frequency of the first bandpass filter 235-v may not be the same as the carrier frequency $f_{tx}$ for the transmit beam signal, as long as the first frequency range allows the transmit element signal to pass (e.g., while excluding the control signal and the modulated receive beam signal). The second bandpass filter 235-w may allow a frequency band of a second frequency range to pass, where the second frequency range corresponds to at least the frequency range of the receive element signal (e.g., the modulated receive beam signal). Although shown having a center frequency equal to $f_{rx}$, the center frequency of the second bandpass filter 235-w may not be the same as the carrier frequency $f_{rx}$ for the receive element signal, as long as the second frequency range allows the receive element signal to pass (e.g., while excluding the control signal and the transmit beam signal). The third bandpass filter 235-x may allow signals within a third frequency range to pass, where the third frequency range corresponds to at least the frequency range of the control signal (e.g., the modulated control signal). Although shown having a center frequency equal to $f_c$, the center frequency of the third bandpass filter 235-x may not be the same as the carrier frequency $f_c$ for the control signal, as long as the third frequency range allows the control signal to pass (e.g., while excluding the transmit beam signal and the receive beam signal). The second routing circuit 250-g may provide the adjusted receive element signal, in the opposite direction, with the individual output signal 246-g to provide the adjusted receive element signal to the output element signal port 245-g of the beam forming network 210-d. As described above, other potential implementations may be used, including the use of other PCB traces, components including high- and low-pass filters, capacitors, inductors, and the like.

In the control circuit 215-g, the control signal path 252-g may run through a demodulator 255-g, an address decoder 260-g, and respective receive and transmit adjustment circuits 265. The demodulator 255-g may demodulate the control signal carried on the control signal path 252-g to obtain control information. The control information may include commands for the control circuits 215 that are then distributed to each of the control circuits 215 by the beam forming network 210-d. That is, in addition to receiving its own control data, the control circuit 215-g may receive and demodulate the control information for each of the other control circuits 215. The control information may include address information (e.g., in a header) identifying the address of the particular control circuit 215 for which the corresponding control information is intended. The address decoder 260-g may compare a known address (as further discussed below) of the control circuit 215-g to the address information in the control data 226-d to identify the control information that is intended for the particular control circuit 215-g and its corresponding receive antenna element 220-g and transmit antenna element 220-h. The address decoder 260-g may provide the identified control information via signal paths 253 to the corresponding adjustment circuits 265. For example, the address decoder 260-g may provide control information via a signal path 253-g for a receive beam adjustment to the receive adjustment circuit 265-g and control information via a signal path 253-h for a transmit beam adjustment to the transmit adjustment circuit 265-h. As described herein, the adjustment circuits 265 may include one or more circuit elements (e.g., one or more phase shifters 270, one or more amplifiers 275, etc.) to provide, based on the identified control information, an appropriate adjustment of amplitude and/or phase to the corresponding element signal. The adjustments applied to the element signals for each of the antenna elements 220 of the phase array antenna together produce transmit and receive beams in desired scan angle directions.

In some cases, the control circuit 215-g and the controller 225-d may support further bi-directional communication (e.g., bi-directional communication of control information in addition to bi-directional communication of element signals). For example, the control circuit 215-g may also have a modulator (not shown), which may be part of the demodulator 255-g, or a separate component. Controller 225-d may send a command to read a configured value (e.g., control information) from one of the control circuits 215 (e.g., the control circuit 215-g) and the addressed control circuit 215 may respond by modulating a signal with the response (e.g., the configured value) and multiplexing the modulated signal onto the individual output signal 246-g at the respective element signal port 245-g. The modulated signal may then be carried via the beam forming network 210-d and the first routing circuit 205-d to the controller 225-d, which may then demodulate the signal and decode the response. Thus, further bi-directional communication may allow for checking a configuration of the control circuits 215-g, or reading other status information from the control circuits 215 for testing or debugging purposes.

Figure 7:
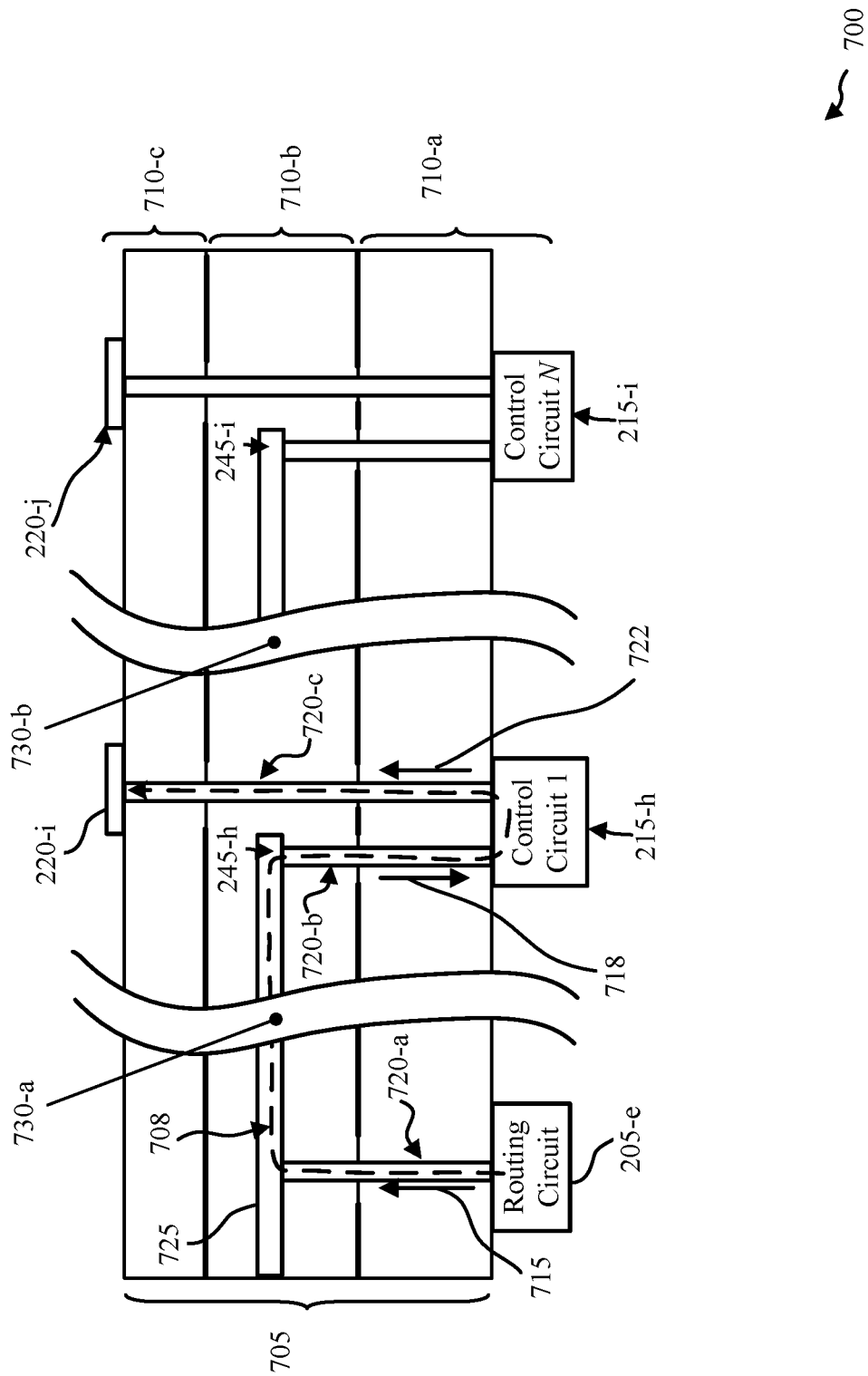
FIG. 7 illustrates an example diagram of multi-layer printed circuit board (PCB) for a circuit architecture for distributed multiplexed control and element signals for a phased array antenna in accordance with aspects of the present disclosure.

FIG. 7 illustrates an example diagram 700 of multi-layer PCB 705 for a circuit architecture for distributed multiplexed control and element signals for a phased array antenna in accordance with aspects of the present disclosure. The phased array antenna may be an example of one or more of the antenna arrays 140, as described with reference to FIG. 1, and the circuit architecture for distributed multiplexed control and element signals for a phased array antenna as described with reference to FIGS. 2 and 4 through 6. The phased array antenna of FIG. 7 may be an example of a transmit phased array antenna for transmitting communication signals to the satellite 105, as described with reference to FIG. 1, and the circuit architecture for distributed multiplexed control and element signals for a phased array antenna as described with reference to FIGS. 2, 4, and 6. The circuit architecture for the phased array antenna in FIG. 7 may operate in substantially the same way with similar or corresponding components as described with reference to FIGS. 2, 4, and/or 6. Further, while FIG. 7 shows a transmission operation of a phased array antenna, the phased array antenna may be configured for reception, as described with reference to FIG. 5.

As shown in FIG. 7, the multi-layer PCB 705 may include one or more sections 710, including a first section 710-*a* including control circuits, a second section 710-*b* including a beam forming network, and a third section 710-*c* including antenna elements 220. Each section 710 may include one or more PCB layers. It should be understood that while these three sections are only one example implementation of a multi-layer PCB 705 for the described circuit architecture, and that other implementations may be used, such as with different components on different PCB layers in different sections 710, etc.

In the example shown in FIG. 7, the first routing circuit 205-*e* and each of the control circuits 215 are located the bottom side of a bottom layer of the multi-layer PCB 705. A signal path 708 (e.g., a signal path 1) is shown as the dashed line from first routing circuit 205-*e* to an antenna element 220-*i*. The first routing circuit 205-*e* outputs a composite multiplexed signal 715 (including a transmit beam signal and a control signal) onto via 720-*a*, where the via 720-*a* is connected to a conductive trace on a layer 725. The signal path 708 carrying the composite multiplexed signal 715 may then be input into a beam forming network including multiple stages of PCB dividers 730 that divide the composite multiplexed signal 715 to produce individual multiplexed signals at respective element signal ports 245. For example, a first PCB divider 730-*a* of the beam forming network may provide a first multiplexed control and element signal to a first element signal port 245-*h* intended for the first antenna element 220-*i* via a first control circuit 215-*h*, a second PCB divider 730-*b* of the beam forming network may provide a second multiplexed control and element signal to a second element signal port 245-*i* intended for a second antenna element 220-*j* via a second control circuit 215-*i*, and so on.

As shown in the example implementation of FIG. 7, at the element signal port 245-*h* (i.e., an output port 1), an individual multiplexed signal 718 may carry multiplexed individual control and element signals intended for the antenna element 220-*i*. Via 720-*b* is connected to the element signal port 245-*h* of the beam forming network and carries the individual multiplexed signal 718 (i.e., an individual multiplexed signal 1 including an element signal 1 and a corresponding control signal) to the input of the control circuit 215-*h* (i.e., a control circuit 1). As discussed above, the control circuit 215-*h* may demodulate the control signal and identify the control information addressed to it. The control circuit 215-*h* may provide the identified control information to its corresponding adjustment circuit which adjusts the element signal 1 in phase and/or amplitude based on the control information to produce an adjusted individual element signal 722. The adjusted individual element signal 722 may be provided at the output of the control circuit 215-*h* onto via 720-*c* and carried to the antenna element 220-*i* for transmission.

Figure 8:
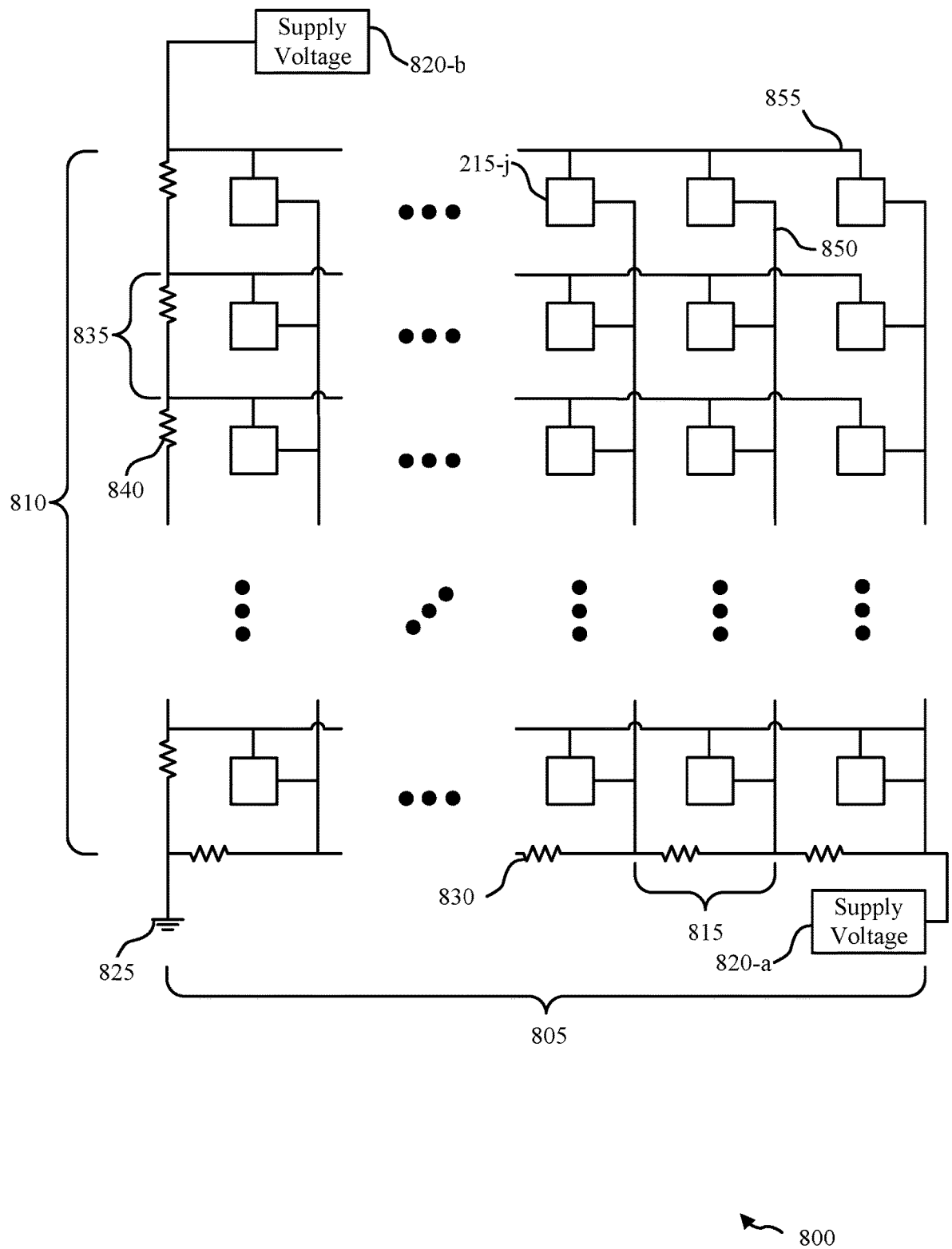
FIG. 8 illustrates an example diagram of an address decoder for a circuit architecture for distributed multiplexed control and element signals for a phased array antenna in accordance with aspects of the present disclosure.

FIG. 8 illustrates an example diagram 800 of an addressing architecture for distributed multiplexed control and element signals for a phased array antenna in accordance with aspects of the present disclosure. The addressing architecture may be an example of addressing architecture for one or more of the address decoders 260 as described with references to FIGS. 2 and 4 through 6. The example diagram 800 illustrates multiple control circuits 215-*j* arrayed in rows and columns on a PCB of an antenna array.

Each control circuit 215-*j* of the antenna array may recognize its own address by reading address voltage levels, for example using an ADC. As shown in FIG. 8, the addressing architecture includes a column voltage divider 805 and a row voltage divider 810. The column voltage divider 805 may include one or more columns 815 from a supply voltage 820-*a* to a voltage ground 825. The column voltage divider 805 may include a number m of column voltage divider elements 830 (e.g., resistor voltage dividers), where the combination of column voltage divider elements 830 may divide the supply voltage to obtain the resulting column voltages 850 for each column 815. The row voltage divider 810 may also include a number n of rows 835 from a supply voltage 820-*b* to the voltage ground 825. The row voltage divider 810 may include one or more row voltage divider elements 840 (e.g., resistor voltage dividers), where the combination of row voltage divider elements 840 may divide the supply voltage to obtain the resulting row voltages 855 for each row 835.

Each control circuit 215-*j* may be located at a position in one of the columns 815 coupled to one of the column voltages 850. Similarly, each address element 845 lies at a position in one of the rows 835 coupled to one of the row voltages 855. In this way, each control circuit 215-*j* may be located at a respective unique combination of row and column addresses. Each control circuit 215-*j* may include a row address pin that receives the corresponding row voltage and a column address pin that receives the corresponding column voltage. ADCs may then be used to read these voltages at the row and column address pins, thus identifying the particular control information (e.g., particular beam adjustment coefficients for amplitude and/or phase) intended for the corresponding antenna element. The illustrated addressing architecture may use a relatively lower pin-count versus using pull-up/down or open/short address strapping, which may reduce PCB area and cost for each control circuit.

As described above, in some cases, the addresses of the control circuits may be selected (e.g., using sequential row and column addresses) such that if a control circuit applies control information for an incorrectly decoded address, the control information applied by the control circuit is likely intended for one of the adjacent control circuits (i.e., a control circuit may at (m, n) apply control information intended for an antenna element at (m, n+1) or (m, n−1). Where row and column voltage levels are used for addressing of control circuits, errors in reading the row or column address voltage may also apply control information intended for an adjacent or proximate control circuit. In these cases, the adjustments indicated by the control information of, for example, an adjacent control circuit 215 may not substantially differ from the adjustment indicated for the actual location of the control circuit 215. For example, one control circuit 215 would apply an adjustment (e.g., of phase and/or amplitude) intended for its nearest neighboring control circuit 215 by row and/or column, which may not substantially degrade the RF beam forming performance of some antenna arrays.

In some cases, and as described above, the control signal and the beam signal may be provided to the beam forming network concurrently. However, in some cases, a controller may not provide the control signal continuously and/or not concurrently with the beam signal. Rather, in some cases, the controller may provide the control information from time to time as needed to reconfigure the phased array antenna to change a desired scan angle direction.

The various illustrative blocks and components (e.g., the controllers 225, the modulators 230, and/or each of the various components of the first routing circuits 205 and the control circuits 215) described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, multiple microprocessors, microprocessors in conjunction with a DSP core, or any other such configuration The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. A phased array antenna system, comprising:
a beam forming network to convert between a plurality of element signals at a plurality of element signal ports and a beam signal at a common signal port, the beam forming network being located on one or more layers of a printed circuit board (PCB);
a first signal routing circuit to provide a control signal from a controller to the common signal port, wherein the beam forming network distributes the control signal to each of the plurality of element signal ports; and
a plurality of control circuits located on a first layer of the PCB, each control circuit having a first port coupled to a corresponding element signal port of the plurality of element signal ports and a second port coupled to a corresponding antenna element, the antenna elements corresponding to each of the control circuits being located on a second layer of the PCB, each of the plurality of control circuits comprising:
a second signal routing circuit coupled to the first port, the second signal routing circuit to establish an element signal path for a corresponding element signal of the plurality of element signals communicated between the first port and the second port, and to establish a control signal path for the control signal received via the first port, and
a first signal adjustment circuit along the element signal path and the control signal path, the first signal adjustment circuit to adjust the corresponding element signal based at least in part on the control signal.

2. The phased array antenna system of claim 1, wherein the first signal routing circuit comprises:
a multiplexer that multiplexes the control signal and the beam signal to generate a composite multiplexed signal comprising the control signal and the beam signal.

3. The phased array antenna system of claim 2, wherein the control signal and the beam signal occupy non-overlapping frequency bands.

4. The phased array antenna system of claim 2, wherein the composite multiplexed signal further comprises a power signal multiplexed with the control signal and the beam signal.

5. The phased array antenna system of claim 4, wherein each control circuit of the plurality of control circuits comprises a decoupler to obtain the power signal for supplying power to each of the control circuits.

6. The phased array antenna system of claim 2, wherein the beam forming network converts between the composite multiplexed signal and a plurality of individual multiplexed signals at the plurality of element signal ports.

7. The phased array antenna system of claim 6, wherein the second signal routing circuit of each of the plurality of control circuits demultiplexes one of the plurality of individual multiplexed signals to obtain the control signal and the corresponding element signal of the plurality of element signals.

8. The phased array antenna system of claim 1, wherein the first signal routing circuit further provides a power signal to the common signal port, wherein the beam forming network distributes the power signal to each of the plurality of element signal ports.

9. The phased array antenna system of claim 8, wherein the beam signal comprises a receive beam signal and the power signal is multiplexed with the receive beam signal.

10. The phased array antenna system of claim 1, wherein the second signal routing circuit comprises:
a multiplexer that multiplexes a respective control signal from the first port of the respective control circuit to the first signal adjustment circuit and a respective element signal from the second port of the respective control circuit to the first port of the respective control circuit.

11. The phased array antenna system of claim 10, wherein the beam forming network converts the control signal at the common signal port to a plurality of individual control signals at the plurality of element signal ports and from a plurality of individual multiplexed signals at the plurality of element signal ports to a composite multiplexed signal at the common signal port.

12. The phased array antenna system of claim 11, wherein the first signal routing circuit demultiplexes the composite multiplexed signal to obtain the beam signal.

13. The phased array antenna system of claim 1, wherein the beam forming network comprises one or more combiner/dividers between the common signal port and the plurality of element signal ports, the one or more combiner/dividers being located on the one or more layers of the PCB.

14. The phased array antenna system of claim 1, wherein the control signal comprises a plurality of adjustment values and corresponding address indicators, wherein each of the address indicators identifies an address of one of the control circuits of the plurality of control circuits for which the corresponding adjustment value of the control signal is intended.

15. The phased array antenna system of claim 14, wherein each of the plurality of control circuits identifies its respective address based at least in part on respective coupling of a plurality of address pins.

16. The phased array antenna system of claim 14, wherein each of the plurality of control circuits identifies its respective address based at least in part on one or more of a row voltage obtained by a row voltage divider, a column voltage obtained by a column voltage divider, or a combination thereof, each row voltage divider comprising a plurality of row voltage divider elements and each column voltage divider comprising a plurality of column voltage divider elements.

17. The phased array antenna system of claim 14, wherein adjacent control circuits of the plurality of control circuits have addresses, the addresses having a single different address bit value.

18. The phased array antenna system of claim 14, wherein the address indicators comprise at least one error correction bit.

19. The phased array antenna system of claim 1, wherein the first signal adjustment circuits of the plurality of control circuits apply respective first signal adjustments to respective element signals to obtain respective ones of a plurality of adjusted element signals.

20. The phased array antenna system of claim 19, wherein the beam signal comprises a receive beam signal, and the beam forming network combines the plurality of adjusted element signals to obtain the receive beam signal.

21. The phased array antenna system of claim 19, wherein the beam signal comprises a transmit beam signal, and the beam forming network divides the transmit beam signal to obtain the plurality of element signals, and wherein the respective adjusted element signals are transmitted by the corresponding antenna elements.

22. The phased array antenna system of claim 19, wherein the first signal adjustment circuit comprises an amplifier to apply an amplitude adjustment, a phase shifter to apply a phase adjustment, or a combination thereof.

23. The phased array antenna system of claim 19, wherein the controller determines a second signal adjustment and provides the second signal adjustment to the respective control circuit while the first signal adjustment circuit is operating according to the first signal adjustment, the second signal adjustment to be applied subsequent to the first signal adjustment.

24. The phased array antenna system of claim 23, wherein the first signal adjustment and the second signal adjustment are associated with different frequency bands.

25. The phased array antenna system of claim 1, wherein the first signal adjustment circuits of the plurality of control circuits comprise receive adjustment circuits to adjust respective receive element signals received via the corresponding antenna element, and wherein each of the plurality of control circuits comprises a transmit signal adjustment circuit to adjust a transmit element signal to be transmitted via the corresponding antenna element.

26. The phased array antenna system of claim 25, wherein each of the corresponding antenna elements comprises a first antenna element coupled with the receive element signal and a second antenna element coupled with the transmit element signal.

27. The phased array antenna system of claim 1, wherein the antenna elements comprise patch antennas located on the second layer of the PCB.

28. The phased array antenna system of claim 1, wherein the first layer of the PCB and the second layer of the PCB are a same layer.

* * * * *